(12) United States Patent
Wu et al.

(10) Patent No.: US 10,231,152 B2
(45) Date of Patent: *Mar. 12, 2019

(54) NETWORK HANDOVER METHOD, DEVICE, AND SYSTEM

(71) Applicant: Huawei Technologies Co., Ltd., Shenzhen, Guangdong (CN)

(72) Inventors: Xiaobo Wu, Shanghai (CN); Hai Liu, Shanghai (CN); Daliang Zhang, Shanghai (CN); Xinyong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,888

(22) Filed: Dec. 11, 2015

(65) Prior Publication Data

US 2016/0100338 A1    Apr. 7, 2016

Related U.S. Application Data

(63) Continuation of application No. PCT/CN2013/077199, filed on Jun. 13, 2013.

(51) Int. Cl.
*H04W 36/00* (2009.01)
*H04L 29/06* (2006.01)

(52) U.S. Cl.
CPC ..... *H04W 36/0022* (2013.01); *H04L 65/1069* (2013.01)

(58) Field of Classification Search
CPC ................................ H04W 36/00; H04L 65/00
See application file for complete search history.

(56) References Cited

U.S. PATENT DOCUMENTS

| 9,826,440 B2 * | 11/2017 | Wu ........................ H04W 76/10 |
| 2009/0073936 A1 * | 3/2009 | Jentz ................. H04W 36/0022 370/331 |
| 2009/0268635 A1 | 10/2009 | Gallagher et al. |

(Continued)

FOREIGN PATENT DOCUMENTS

| CN | 101227677 A | 7/2008 |
| CN | 102045791 A | 5/2011 |

(Continued)

OTHER PUBLICATIONS

3GPP TS23.272 v9.0.0 (Jun. 2009).*

(Continued)

*Primary Examiner* — Sumitra Ganguly

(57) ABSTRACT

The present invention discloses a network handover method, where after UE in an LTE network requests circuit switched fallback CSFB, an MME instructs an eNB to move the UE from the LTE network to a 2G or 3G network, and requests an MSC to hand over the UE from the LTE network to a CS domain of the 2G or 3G network for the CSFB, so that the 2G or 3G network allocates a CS domain resource to the UE. After handing over to the CS domain, the UE may perform a CS domain call. By using embodiments of the present invention, an access delay is reduced when the UE accesses the CS domain of the 2G or 3G network, duration of an entire voice call is shortened, and user experience is improved.

14 Claims, 9 Drawing Sheets

(56) References Cited

U.S. PATENT DOCUMENTS

| | | | |
|---|---|---|---|
| 2010/0303041 A1* | 12/2010 | Diachina | H04W 36/14 370/331 |
| 2010/0309886 A1* | 12/2010 | Vikberg | H04W 36/0066 370/332 |
| 2011/0009120 A1 | 1/2011 | You et al. | |
| 2011/0051691 A1* | 3/2011 | Hietalahti | H04W 8/22 370/331 |
| 2011/0207458 A1 | 8/2011 | Tanaka et al. | |
| 2011/0216645 A1 | 9/2011 | Song et al. | |
| 2011/0235580 A1 | 9/2011 | Kanauchi et al. | |
| 2012/0039382 A1* | 2/2012 | Vonog | H04N 21/2343 375/240.01 |
| 2012/0069731 A1* | 3/2012 | Tooher | H04W 76/16 370/221 |
| 2012/0122459 A1 | 5/2012 | Wu et al. | |
| 2012/0309357 A1* | 12/2012 | Ianev | H04W 36/0022 455/411 |
| 2013/0084860 A1* | 4/2013 | Wong | H04W 60/00 455/435.1 |
| 2014/0140324 A1 | 5/2014 | Stenfelt et al. | |
| 2014/0177599 A1* | 6/2014 | Tao | H04W 36/0022 370/331 |

FOREIGN PATENT DOCUMENTS

| | | |
|---|---|---|
| CN | 102045803 A | 5/2011 |
| CN | 102045805 A | 5/2011 |
| CN | 102598775 A | 7/2012 |
| CN | 103118404 A | 5/2013 |
| EP | 2461627 A1 | 6/2012 |
| JP | 2010045428 A | 2/2010 |
| JP | 2010063151 A | 3/2010 |
| JP | 2010093838 A | 4/2010 |
| RU | 2011147485 A | 5/2013 |
| WO | 2010051873 A1 | 5/2010 |
| WO | 2010120689 A2 | 10/2010 |
| WO | 2011044825 A1 | 4/2011 |

OTHER PUBLICATIONS

"CSFB optimization based on SRVCC", Huawei, China Unicom, 3GPP TSG-SA WG2 Meeting #75, Aug. 31-Sep. 4, 2009, 12 pages, S2095143.

"3rd Generation Partnership Project; Technical Specification Group Services and System Aspects; Intra-domain connection of Radio Access Network (RAN) nodes to multiple Core Network (CN) nodes (Release 11)", 3GPP TS 23.236 V11.0.0, Sep. 2012, 40 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 290 pages.

"3rd Generation Partnership Project; Technical Specification Group Services and System Aspects; Circuit Switched (CS) fallback in Evolved Packet System (EPS); Stage 2 (Release 11)", 3GPP TS 23.272 V11.0.0, Mar. 2012, 87 pages.

"3GPP TS 23.216 V11.8.0 (Mar. 2013), 3rd Generation Partnership Project; Technical Specification Group Services and System Aspects; Single Radio Voice Call Continuity (SRVCC); Stage 2 (Release 11)," 68 pages, XP050691810.

3GPP TS 23.216 V8.4.0 (Jun. 2009), 3rd Generation Partnership Project; Technical Specification Group Services and System Aspects; Single Radio Voice Call Continuity (SRVCC); Stage 2 (Release 8), 35 pages.

"3rd Generation Partnership Project; Technical Specification Group Services and System Aspects; Single Radio Voice Call Continuity (SRVCC); Stage 2 (Release 9)"; 3GPP TS 23.216 V9.0.0; Jun. 2009; 39 pages.

Huawei; "Enhanced CSFB solution based on SRVCC"; 3GPP TSG-SA WG2 Meeting #75; S2-095144; Kyoto, Japan, Aug. 31-Sep. 4, 2009; 14 pages.

* cited by examiner

NETWORK HANDOVER METHOD, DEVICE, AND SYSTEM

CROSS-REFERENCE TO RELATED APPLICATIONS

This application is a continuation of International Application No. PCT/CN2013/077199, filed on Jun. 13, 2013, which is hereby incorporated by reference in its entirety.

TECHNICAL FIELD

The present invention relates to the field of communications technologies, and in particular, to a network handover method, device, and system.

BACKGROUND

Universal coverage of a second generation (2G) or third generation (3G) network such as global system for mobile communications (GSM) or wideband code division multiple access (WCDMA) has basically been implemented.

With the development of Long Term Evolution (LTE) network technologies, the LTE network has covered some urban areas and traffic hotspot areas, and in this way, in current communications networks, the LTE network coexists with the 2G or 3G network.

In a calling process, user equipment (UE) may enter the 2G or 3G network from the LTE network, and because bearing mechanisms of the LTE network and the 2G or 3G network are different, the user equipment needs to hand over from a packet switching (PS) domain to a circuit switching (CS) domain, and an interruption of a voice call may occur, thereby affecting continuity of a voice call of a user.

Circuit switched fallback (CSFB) is: when user equipment (UE) in coverage of LTE processes a voice service, the UE first returns to a network having a CS domain, and processes the voice service in the network having a CS domain, thereby achieving an objective of providing a conventional voice service for a user in an LTE network by re-using an existing CS domain device. In the prior art, the UE needs to hand over from the LTE network to a PS domain of the 2G or 3G network, or be redirected from the LTE network to the 2G or 3G network, and then initiates a CS domain connection in the 2G or 3G network.

In the prior art, even when the UE can support a handover from the LTE network to the CS domain of the 2G or 3G network, the UE also needs to move to the PS domain of the 2G or 3G network before initiating a voice call, thereby causing that entire voice call duration is relatively long, and user experience is poor.

SUMMARY

For the foregoing problem in the prior art, embodiments of the present invention provide a network handover method, where in a CSFB implementation process, UE is triggered to hand over from an LTE network to a CS domain of a 2G or 3G network, which reduces an access delay when the UE accesses the CS domain of the 2G or 3G network, and also improves user experience. The embodiments of the present invention further provide a corresponding device and system.

A first aspect of the present invention provides a network handover method, including:

receiving, by a mobility management entity NNE, a request message initiated by user equipment UE located in a Long Term Evolution LTE network, where the request message is used for requesting circuit switched fallback CSFB;

sending, by the NNE, a notification message to an evolved base station eNodeB according to the request message, where the notification message is used for instructing the eNodeB to move the UE from the LTE network to a circuit switching CS domain of a second generation 2G or third generation 3G network for the CSFB;

receiving, by the MME, a handover required message sent by the eNodeB; and sending, by the MME, a first handover request message to a mobile switching center MSC, where the first handover request message is used for requesting the MSC to hand over the UE from the LTE network to the CS domain of the 2G or 3G network for the CSFB, so that the 2G or 3G network allocates a CS domain resource to the UE, where the CS domain resource is used for the UE to hand over from the LTE network to the CS domain of the 2G or 3G network.

With reference to the first aspect, in a first possible implementation manner, the notification message is further used for indicating that the LTE network, the 2G or 3G network, and the UE support handing over the UE from the LTE network to the CS domain of the 2G or 3G network for the CSFB; or, the handover required message is further used for indicating that the UE supports a handover from the LTE network to the CS domain of the 2G or 3G network.

With reference to the first aspect or the first possible implementation manner of the first aspect, in a second possible implementation manner, the notification message includes indication information, where the indication information is used for indicating that the LTE network, the 2G or 3G network, and the UE support handing over the UE from the LTE network to the CS domain of the 2G or 3G network for the CSFB.

With reference to the second possible implementation manner of the first aspect, in a third possible implementation manner, the indication information is used for indicating that the LTE network, the 2G or 3G network, and the UE support a single radio voice call continuity SRVCC handover.

With reference to the first aspect, or any one of the first to the third possible implementation manners of the first aspect, in a fourth possible implementation manner, the method further includes:

determining, by the MME, that the LTE network and the 2G or 3G network support handing over the UE from the LTE network to the CS domain of the 2G or 3G network for the CSFB, and that the UE supports a handover from the LTE network to the CS domain of the 2G or 3G network.

With reference to the first aspect, or any one of the first to the fourth possible implementation manners of the first aspect, in a fifth possible implementation manner, the method further includes:

receiving, by the MME, a first handover response message that is sent by the MSC in response to the first handover request message, where the first handover response message includes information about a CS domain wireless resource allocated to the UE by a base station in the 2G or 3G network; and sending, by the MME, a handover required response message to the eNodeB, where the handover required response message includes the information about the CS domain wireless resource, and the information about the CS domain wireless resource is used for the UE to hand over from the LTE network to the CS domain of the 2G or 3G network for the CSFB.

With reference to the first aspect, or any one of the first to the fifth possible implementation manners of the first aspect, in a sixth possible implementation manner, the handover required message is a handover required message of a handover from the LTE network to a packet switching PS domain of the 2G or 3G network, or a handover required message of a handover from the LTE network to the CS domain of the 2G or 3G network.

With reference to the first aspect, or any one of the first to the fifth possible implementation manners of the first aspect, in a seventh possible implementation manner, the handover required message is a handover required message of a handover from the LTE network to a PS domain and the CS domain of the 2G or 3G network.

With reference to the seventh possible implementation manner of the first aspect, in an eighth possible implementation manner, the method further includes:

sending, by the MME, a second handover request message to a serving general packet radio service support node SGSN, where the second handover request message is used for requesting the SGSN to initiate a handover from the LTE network to the PS domain of the 2G or 3G network.

A second aspect of the present invention provides a network handover method, including:

receiving, by an evolved base station eNodeB located in a Long Term Evolution LTE network, a notification message sent by a mobility management entity MME, where the notification message is used for instructing the eNodeB to move user equipment from the LTE network to a circuit switching CS domain of a 2G or 3G network for circuit switched fallback CSFB;

sending, by the eNodeB, a handover required message to the MME;

receiving, by the eNodeB, a handover required response message sent by the MME, where the handover required response message includes information about a CS domain wireless resource, and the information about the CS domain wireless resource is used for the UE to hand over from the LTE network to the CS domain of the 2G or 3G network; and sending, by the eNodeB, a handover command to the UE, where the handover command is used for instructing the UE to hand over from the LTE network to the CS domain of the 2G or 3G network, and the handover command includes the information about the CS domain wireless resource.

With reference to the second aspect, in a first possible implementation manner, the notification message is further used for indicating that the LTE network, the 2G or 3G network, and the UE support handing over the UE from the LTE network to the CS domain of the 2G or 3G network for the CSFB; or, the handover command is used for instructing the UE to hand over from the LTE network to the circuit switching CS domain of the 2G or 3G network for the CSFB.

With reference to the second aspect, or the first possible implementation manner of the second aspect, in a third possible implementation manner, the method further includes:

determining, by the eNodeB, that the UE supports a handover from the LTE network to the CS domain of the 2G or 3G network.

With reference to the second aspect, or the first or second possible implementation manner of the second aspect, in a third possible implementation manner, the handover required message includes first indication information, where the first indication information is used for requesting the MME to hand over the UE from the LTE network to the CS domain of the 2G or 3G network for the CSFB;

or, the first indication information is used for requesting the MME to hand over the UE from the LTE network to the CS domain of the 2G or 3G network for the CSFB, and indicating that the UE supports a handover from the LTE network to the CS domain of the 2G or 3G network;

or, the handover required message includes a source to target transparent container, where the source to target transparent container includes second indication information, and the second indication information is used for requesting a base station in the 2G or 3G network to hand over the UE from the LTE network to the CS domain of the 2G or 3G network for the CSFB.

With reference to the third possible implementation manner of the second aspect, in a fourth possible implementation manner, the second indication information is further used for indicating that the UE supports a handover from the LTE network to the CS domain of the 2G or 3G network.

With reference to the second aspect, or any one of the first to the fourth possible implementation manners of the second aspect, in a fifth possible implementation manner, the handover required message is a handover required message of a handover from the LTE network to a packet switching PS domain of the 2G or 3G network, or a handover required message of a handover from the LTE network to the CS domain of the 2G or 3G network.

With reference to the second aspect, or any one of the first to the fourth possible implementation manners of the second aspect, in a sixth possible implementation manner, the handover required message is a handover required message of a handover from the LTE network to a PS domain and the CS domain of the 2G or 3G network.

With reference to the sixth possible implementation manner of the second aspect, in a seventh implementation manner, determining, by the eNodeB, that the UE supports a handover from the LTE network to the PS domain of the 2G or 3G network, where the handover command is further used for instructing the UE to hand over from the LTE network to the PS domain of the 2G or 3G network, the handover command includes information about a PS domain resource of the 2G or 3G network, and the information about the PS domain resource is used for the UE to hand over from the LTE network to the PS domain of the 2G or 3G network.

A third aspect of the present invention provides a network handover method, including:

receiving, by a mobile switching center MSC, a first handover request message sent by a mobility management entity MME, where the first handover request message is used for requesting the MSC to hand over user equipment UE from a Long Term Evolution LTE network to a circuit switching CS domain of a second generation 2G or third generation 3G network for circuit switched fallback CSFB;

sending, by the MSC, a third handover request message to a base station in the 2G or 3G network, where the third handover request message is used for requesting the base station to allocate a CS domain resource to the UE for handing over to the CS domain of the 2G or 3G network;

receiving, by the MSC, a third handover request response message sent by the base station, where the third handover request response message includes information about a CS domain wireless resource that is allocated by the base station to the UE for handing over to the CS domain of the 2G or 3G network;

sending, by the MSC, a first handover response message to the MME, where the first handover response message includes the information about the CS domain wireless resource; and receiving, by the MSC, a handover completion message sent by the UE, where the handover completion message is used for indicating that the UE completes handing over from the LTE network to the CS domain of the 2G or 3G network.

With reference to the third aspect, in a first possible implementation manner, the first handover request message is further used for indicating that the UE supports a handover from the LTE network to the CS domain of the 2G or 3G network.

With reference to the third aspect, or the first possible implementation manner of the third aspect, in a second possible implementation manner, the method further includes: receiving, by the MSC, a first CS call connection setup request message sent by the UE, where the first CS call connection setup request message is used for requesting the MSC to generate a first session.

With reference to the third aspect, or the first possible implementation manner of the third aspect, in a third possible implementation manner, the method further includes:

sending, by the MSC, a second CS call connection setup request message to the UE, where the second CS call connection setup request message is used for requesting the UE to generate a second session.

With reference to the first possible implementation manner of the third aspect, in a fourth possible implementation manner, the method further includes:

after receiving the first CS call connection setup request message, sending, by the MSC, a session release message to the UE, where the session release message is used for requesting the UE to release a third session that is generated by the UE in a process of handing over from the LTE network to the CS domain of the 2G or 3G network.

With reference to the second possible implementation manner of the third aspect, in a fifth possible implementation manner, the method further includes:

after receiving a call confirmation message responding to the second CS call connection setup request message, sending, by the MSC, a session release message to the UE, where the session release message is used for requesting the UE to release a third session that is generated by the UE in a process of handing over from the LTE network to the CS domain of the 2G or 3G network.

A fourth aspect of the present invention provides a network handover method, including:

sending, by user equipment UE located in a Long Term Evolution LTE network, a request message to a mobility management entity MME, where the request message is used for requesting circuit switched fallback CSFB;

receiving, by the UE, a handover command sent by an evolved base station eNodeB, where the handover command is used for instructing the UE to hand over from the LTE network to a circuit switching CS domain of a 2G or 3G network for the CSFB, and the handover command includes information about a CS domain wireless resource that is allocated by the 2G or 3G network to the UE for handing over from the LTE network to the CS domain of the 2G or 3G network; and handing over, by the UE, from the LTE network to the CS domain of the 2G or 3G network according to the handover command.

With reference to the fourth aspect, in a first possible implementation manner, the method further includes:

sending, in the CS domain of the 2G or 3G network by the UE, a CS call connection setup request message to a mobile switching center MSC, where the CS call connection setup request message is used for requesting the MSC to generate a first session.

With reference to the fourth aspect, in a second possible implementation manner, the method further includes: receiving, in the CS domain of the 2G or 3G network by the UE, a CS call connection setup request message sent by the MSC, where the CS call connection setup request message is used for requesting the UE to generate a second session.

With reference to the fourth aspect, or the first or the second possible implementation manner of the fourth aspect, in a third possible implementation manner, the method further includes:

receiving, by the UE, a session release message sent by the MSC, where the session release message is used for instructing the UE to release a third session that is generated by the UE in a process of handing over from the LTE network to the CS domain of the 2G or 3G network.

With reference to the fourth aspect, or any one of the first to the third possible implementation manners of the fourth aspect, in a fourth possible implementation manner, the handover command further includes information about a PS domain wireless resource that is allocated by the 2G or 3G network to the UE for handing over from the LTE network to a packet switching PS domain of the 2G or 3G network.

A fifth aspect of the present invention provides a network handover method, including:

receiving, by a base station in a 2G or 3G network, a third handover request message sent by a mobile switching center MSC, where the third handover request message is used for requesting the base station to hand over user equipment UE from a Long Term Evolution LTE network to a circuit switching CS domain of the 2G or 3G network for circuit switched fallback CSFB;

sending, by the base station, a third handover request response message to the MSC, where the third handover request response message includes information about a CS domain wireless resource, and the information about the CS domain wireless resource is used for the UE to hand over from the LTE network to the CS domain of the 2G or 3G network; and receiving, by the base station, a handover completion message sent by the UE, where the handover completion message is used for indicating that the UE completes handing over from the LTE network to the CS domain of the 2G or 3G network.

With reference to the fifth aspect, in a first possible implementation manner, the third handover request message includes indication information, where the indication information is used for requesting the base station to hand over the UE from the LTE network to the CS domain of the 2G or 3G network for the CSFB;

and/or, the indication information is used for indicating that the UE supports a handover from the LTE network to the CS domain of the 2G or 3G network.

With reference to the first possible implementation manner of the fifth aspect, in a second possible implementation manner, the third handover request message includes a source to target transparent container, and the source to target transparent container includes the indication information.

With reference to the fifth aspect, or the first or the second possible implementation manner of the fifth aspect, in a third possible implementation manner, the method further includes: after receiving the handover completion message, sending, by the base station, Universal Mobile Telecommunications System terrestrial radio access network UTRAN mobility information to the UE, where the UTRAN mobility information does not include a location domain identity LAI, and after a predetermined time, sending, by the base station, the LAI to the UE;

or, sending, by the base station, UTRAN mobility information to the UE, where the UTRAN mobility information does not include an LAI, and after receiving a call release message or call connection completion message sent by the MSC or a call connection completion message sent by the UE, sending, by the base station, the LAI to the UE.

With reference to the fifth aspect, or the first or the second possible implementation manner of the fifth aspect, in a fourth possible implementation manner, the method further includes:

receiving, by the base station, a location update request message sent by the UE, and determining, by the base station, to skip sending the location update request message to the MSC; and sending, by the base station, a location update acceptance message to the UE.

With reference to the fifth aspect, or the first or the second possible implementation manner of the fifth aspect, in a fifth possible implementation manner, the method further includes:

receiving, by the base station, a call release message sent by the MSC, where the call release message is an Iu interface release command or a clear command; and redirecting, by the base station, the UE to the LTE network, or, handing over, by the base station, the UE to the LTE network.

A sixth aspect of the present invention provides a mobility management entity, including:

a receiving unit, configured to receive a request message initiated by user equipment UE located in a Long Term Evolution LTE network, where the request message is used for requesting circuit switched fallback CSFB;

a generating unit, configured to generate a notification message according to the request message received by the receiving unit, where the notification message is used for instructing an evolved base station eNodeB to move the UE from the LTE network to a circuit switching CS domain of a second generation 2G or third generation 3G network for the CSFB; and a sending unit, configured to send the notification message generated by the generating unit to the eNodeB, where the receiving unit is further configured to receive a handover required message sent by the eNodeB;

the generating unit is further configured to generate a first handover request message according to the handover required message received by the receiving unit, where the first handover request message is used for requesting an MSC to hand over the UE from the LTE network to the CS domain of the 2G or 3G network for the CSFB; and the sending unit is further configured to send the first handover request message generated by the generating unit to the mobile switching center MSC, so that the 2G or 3G network allocates a CS domain resource to the UE, where the CS domain resource is used for the UE to hand over from the LTE network to the CS domain of the 2G or 3G network.

With reference to the sixth aspect, in a first possible implementation manner, the notification message is further used for indicating that the LTE network, the 2G or 3G network, and the UE support handing over the UE from the LTE network to the CS domain of the 2G or 3G network for the CSFB; or, the handover required message includes first indication information, where the first indication information is used for requesting the MME to hand over the UE from the LTE network to the CS domain of the 2G or 3G network for the CSFB;

or, the first indication information is used for requesting the MME to hand over the UE from the LTE network to the CS domain of the 2G or 3G network for the CSFB, and indicating that the UE supports a handover from the LTE network to the CS domain of the 2G or 3G network.

With reference to the sixth aspect or the first possible implementation manner of the sixth aspect, in a second possible implementation manner, the notification message includes indication information, where the indication information is used for indicating that the LTE network, the 2G or 3G network, and the UE support handing over the UE from the LTE network to the CS domain of the 2G or 3G network for the CSFB.

With reference to the second possible implementation manner of the sixth aspect, in a third possible implementation manner, the indication information is used for indicating that the LTE network, the 2G or 3G network, and the UE support a single radio voice call continuity SRVCC handover.

With reference to the sixth aspect, or any one of the first to the third possible implementation manners of the sixth aspect, in a fourth possible implementation manner, the mobility management entity further includes:

a determining unit, configured to determine that the LTE network and the 2G or 3G network support handing over the UE from the LTE network to the CS domain of the 2G or 3G network for the CSFB, and that the UE supports a handover from the LTE network to the CS domain of the 2G or 3G network.

With reference to the sixth aspect, or any one of the first to the fourth possible implementation manners of the sixth aspect, in a fifth possible implementation manner, the receiving unit is further configured to receive a first handover response message that is sent by the MSC in response to the first handover request message, where the first handover response message includes information about a CS domain wireless resource allocated to the UE by a base station in the 2G or 3G network; and the generating unit is further configured to generate a handover required response message according to the handover required message received by the receiving unit, where the handover required response message includes the information about the CS domain wireless resource, and the information about the CS domain wireless resource is used for the UE to hand over from the LTE network to the CS domain of the 2G or 3G network for the CSFB; and the sending unit is further configured to send the handover required response message generated by the generating unit to the eNodeB, where the handover required response message includes the information about the CS domain wireless resource, and the information about the CS domain wireless resource is used for the UE to hand over from the LTE network to the CS domain of the 2G or 3G network for the CSFB.

With reference to the sixth aspect, or any one of the first to the fifth possible implementation manners of the sixth aspect, in a sixth possible implementation manner, the handover required message is a handover required message of a handover from the LTE network to a packet switching PS domain of the 2G or 3G network, or a handover required message of a handover from the LTE network to the CS domain of the 2G or 3G network.

With reference to the sixth aspect, or any one of the first to the fifth possible implementation manners of the sixth aspect, in a seventh possible implementation manner, the handover required message is a handover required message of a handover from the LTE network to a PS domain and the CS domain of the 2G or 3G network.

With reference to the seventh possible implementation manner of the sixth aspect, in an eighth possible implementation manner, the sending unit is further configured to send a second handover request message to a serving general packet radio service support node SGSN, where the second handover request message is used for requesting the SGSN to initiate a handover from the LTE network to the PS domain of the 2G or 3G network.

A seventh aspect of the present invention provides an evolved base station eNodeB, including:

a receiving unit, configured to receive a notification message sent by a mobility management entity MME, where the notification message is used for instructing the eNodeB to move user equipment UE from a Long Term Evolution LTE network to a circuit switching CS domain of a 2G or 3G network for circuit switched fallback CSFB;

a generating unit, configured to generate a handover required message according to the notification message received by the receiving unit; and a sending unit, configured to send the handover required message generated by the generating unit to the MME, where the receiving unit is further configured to receive a handover required response message sent by the MME, where the handover required response message includes information about a CS domain wireless resource, and the information about the CS domain wireless resource is used for the UE to hand over from the LTE network to the CS domain of the 2G or 3G network;

the generating unit is further configured to generate a handover command according to the handover required response message received by the receiving unit, where the handover command is used for instructing the UE to hand over from the LTE network to the CS domain of the 2G or 3G network, and the handover command includes the information about the CS domain wireless resource; and the sending unit is further configured to send the handover command generated by the generating unit to the UE.

With reference to the seventh aspect, in a first possible implementation manner, the notification message is further used for indicating that the LTE network, the 2G or 3G network, and the UE support handing over the UE from the LTE network to the CS domain of the 2G or 3G network for the CSFB; or, the handover command is used for instructing the UE to hand over from the LTE network to the circuit switching CS domain of the 2G or 3G network for the CSFB.

With reference to the seventh aspect, or the first possible implementation manner of the seventh aspect, in a third possible implementation manner, the evolved base station further includes:

a first determining unit, configured to determine that the UE supports a handover from the LTE network to the CS domain of the 2G or 3G network.

With reference to the seventh aspect, or the first or second possible implementation manner of the seventh aspect, in a third possible implementation manner, the handover required message includes first indication information, where the first indication information is used for requesting the MME to hand over the UE from the LTE network to the CS domain of the 2G or 3G network for the CSFB;

or, the first indication information is used for requesting the MME to hand over the UE from the LTE network to the CS domain of the 2G or 3G network for the CSFB, and indicating that the UE supports a handover from the LTE network to the CS domain of the 2G or 3G network;

or, the handover required message includes a source to target transparent container, where the source to target transparent container includes second indication information, and the second indication information is used for requesting a base station in the 2G or 3G network to hand over the UE from the LTE network to the CS domain of the 2G or 3G network for the CSFB.

With reference to the third possible implementation manner of the seventh aspect, in a fourth possible implementation manner, the second indication information is further used for indicating that the UE supports a handover from the LTE network to the CS domain of the 2G or 3G network.

With reference to the seventh aspect, or any one of the first to the fourth possible implementation manners of the seventh aspect, in a fifth possible implementation manner, the handover required message is a handover required message of a handover from the LTE network to a packet switching PS domain of the 2G or 3G network, or a handover required message of a handover from the LTE network to the CS domain of the 2G or 3G network.

With reference to the seventh aspect, or any one of the first to the fourth possible implementation manners of the seventh aspect, in a sixth possible implementation manner, the handover required message is a handover required message of a handover from the LTE network to a PS domain and the CS domain of the 2G or 3G network.

With reference to the sixth possible implementation manner of the seventh aspect, in a seventh possible implementation manner, the evolved base station further includes:

a second determining unit, configured to determine that the UE supports a handover from the LTE network to the PS domain of the 2G or 3G network, where the handover command is further used for instructing the UE to hand over from the LTE network to the PS domain of the 2G or 3G network, the handover command includes information about a PS domain resource of the 2G or 3G network, and the information about the PS domain resource is used for the UE to hand over from the LTE network to the PS domain of the 2G or 3G network.

An eighth aspect of the present invention provides a mobile switching center MSC, including:

a receiving unit, configured to receive a first handover request message sent by a mobility management entity MME, where the first handover request message is used for requesting the MSC to hand over user equipment UE from a Long Term Evolution LTE network to a circuit switching CS domain of a second generation 2G or third generation 3G network for circuit switched fallback CSFB;

a generating unit, configured to generate a third handover request message according to the first handover request message received by the receiving unit, where the third handover request message is used for requesting a base station in the 2G or 3G network to allocate a CS domain resource to the UE for handing over to the CS domain of the 2G or 3G network; and a sending unit, configured to send the third handover request message generated by the generating unit to the base station, where the receiving unit is further configured to receive a third handover request response message sent by the base station, where the third handover request response message includes information about a CS domain wireless resource that is allocated by the base station to the UE for handing over to the CS domain of the 2G or 3G network;

the generating unit is further configured to generate a first handover response message according to the first handover request message received by the receiving unit, where the first handover response message includes the information about the CS domain wireless resource;

the sending unit is further configured to send the first handover response message generated by the generating unit to the MME; and the receiving unit is further configured to receive a handover completion message sent by the UE, where the handover completion message is used for indicating that the UE completes handing over from the LTE network to the CS domain of the 2G or 3G network.

With reference to the eighth aspect, in a first possible implementation manner, the first handover request message is further used for indicating that the UE supports a handover from the LTE network to the CS domain of the 2G or 3G network.

With reference to the eighth aspect, or the first possible implementation manner of the eighth aspect, in a second possible implementation manner, the receiving unit is further configured to receive a first CS call connection setup request message sent by the UE, where the first CS call connection setup request message is used for requesting the MSC to generate a first session.

With reference to the eighth aspect, or the first possible implementation manner of the eighth aspect, in a third possible implementation manner, the sending unit is further configured to send a second CS call connection setup request message to the UE, where the second CS call connection setup request message is used for requesting the UE to generate a second session.

With reference to the second possible implementation manner of the eighth aspect, in a fourth possible implementation manner, the sending unit is further configured to: after the receiving unit receives the first CS call connection setup request message, send a session release message to the UE, where the session release message is used for requesting the UE to release a third session that is generated by the UE in a process of handing over from the LTE network to the CS domain of the 2G or 3G network.

With reference to the third possible implementation manner of the eighth aspect, in a fifth possible implementation manner, the sending unit is further configured to: after the receiving unit receives a call confirmation message, send a session release message to the UE, where the session release message is used for requesting the UE to release a third session that is generated by the UE in a process of handing over from the LTE network to the CS domain of the 2G or 3G network.

A ninth aspect of the present invention provides user equipment, including:

a sending unit, configured to send a request message to a mobility management entity MME, where the request message is used for requesting circuit switched fallback CSFB;

a receiving unit, configured to receive a handover command sent by an evolved base station eNodeB, where the handover command is used for instructing the UE to hand over from a Long Term Evolution LTE network to a circuit switching CS domain of a 2G or 3G network for the CSFB, and the handover command includes information about a CS domain wireless resource that is allocated by the 2G or 3G network to the UE for handing over from the LTE network to the CS domain of the 2G or 3G network; and a handover unit, configured to hand over from the LTE network to the CS domain of the 2G or 3G network according to the handover command received by the receiving unit.

With reference to the ninth aspect, in a first possible implementation manner, the sending unit is further configured to send, in the CS domain of the 2G or 3G network, a first CS call connection setup request message to a mobile switching center MSC, where the first CS call connection setup request message is used for requesting the MSC to generate a first session.

With reference to the ninth aspect, in a second possible implementation manner, the receiving unit is further configured to receive, in the CS domain of the 2G or 3G network, a second CS call connection setup request message sent by a mobile switching center MSC, where the second CS call connection setup request message is used for requesting the UE to generate a second session.

With reference to the ninth aspect, or the first possible implementation of the ninth aspect, in a third possible implementation manner, the receiving unit is further configured to receive a session release message sent by the MSC, where the session release message is used for instructing the UE to release a third session that is generated by the UE in a process of handing over from the LTE network to the CS domain of the 2G or 3G network.

With reference to the ninth aspect, or any one of the first to the third possible implementation manners of the ninth aspect, in a fourth possible implementation manner, the handover command further includes information about a PS domain wireless resource that is allocated by the 2G or 3G network to the UE for handing over from the LTE network to a packet switching PS domain of the 2G or 3G network.

A tenth aspect of the present invention provides a base station in a second generation 2G or third generation 3G network, including:

a receiving unit, configured to receive a third handover request message sent by a mobile switching center MSC, where the third handover request message is used for requesting the base station to hand over user equipment UE from a Long Term Evolution LTE network to a circuit switching CS domain of the 2G or 3G network for circuit switched fallback CSFB;

a generating unit, configured to generate a third handover request response message according to the third handover request message received by the receiving unit, where the third handover request response message includes information about a CS domain wireless resource, and the information about the CS domain wireless resource is used for the UE to hand over from the LTE network to the CS domain of the 2G or 3G network; and a sending unit, configured to send the third handover request response message generated by the generating unit to the MSC, where the receiving unit is further configured to receive a handover completion message sent by the UE, where the handover completion message is used for indicating that the UE completes handing over from the LTE network to the CS domain of the 2G or 3G network.

With reference to the tenth aspect, in a first possible implementation manner, the handover request message includes indication information, where the indication information is used for requesting the base station to hand over the UE from the LTE network to the CS domain of the 2G or 3G network for the CSFB;

and/or, the indication information is used for indicating that the UE supports a handover from the LTE network to the CS domain of the 2G or 3G network.

With reference to the first possible implementation manner of the tenth aspect, in a second possible implementation manner, the handover request message includes a source to target transparent container, and the source to target transparent container includes the indication information.

With reference to the tenth aspect, or the first or the second possible implementation manner of the tenth aspect, in a third possible implementation manner, the sending unit is further configured to send Universal Mobile Telecommunications System terrestrial radio access network UTRAN mobility information to the UE, where the UTRAN mobility information does not include a location domain identity LAI, and after a predetermined time, send the LAI to the UE.

With reference to the tenth aspect, or the first or the second possible implementation manner of the tenth aspect, in a fourth possible implementation manner, the sending unit is further configured to send Universal Mobile Telecommunications System terrestrial radio access network UTRAN mobility information to the UE, where the UTRAN mobility information does not include a location domain identity LAI;

the receiving unit is further configured to receive a call release command or call connection completion message sent by the MSC or a call connection completion message sent by the UE; and the sending unit is further configured to send the LAI to the UE after the receiving unit receives the call release command or the call connection completion message.

With reference to the tenth aspect, or the first or the second possible implementation manner of the tenth aspect, in a fifth possible implementation manner, the receiving unit is further configured to receive a location update request message sent by the UE, and determine to skip sending the location update request message to the MSC; and the sending unit is further configured to send a location update acceptance message to the UE after the receiving unit receives the location update request message.

With reference to the tenth aspect, or the first or the second possible implementation manner of the tenth aspect, in a sixth possible implementation manner, the receiving unit is further configured to receive a call release message sent by the MSC, where the call release message is an Iu interface release command or a clear command; and the base station further includes a redirection unit or a handover unit, where the redirection unit is configured to redirect the UE to the LTE network according to the call release message received by the receiving unit; and the handover unit is configured to hand over the UE to the LTE network according to the call release message received by the receiving unit.

An eleventh aspect of the present invention provides a network handover system, including a mobility management entity, a base station, a mobile switching center, a base station, and user equipment, where the mobility management entity is the mobility management entity described in the foregoing technical solutions;

the evolved base station is the evolved base station described in the foregoing technical solutions;

the mobile switching center is the mobile switching center described in the foregoing technical solutions;

the user equipment is the user equipment described in the foregoing technical solutions; and the base station is the base station described in the foregoing technical solutions.

In the embodiments of the present invention, in a circuit switched fallback implementation process, a handover from an LTE network to a 2G or 3G network is triggered, so that UE can directly hand over from the LTE network to a CS domain of the 2G or 3G network. In this way, a resource may be allocated on a network side to the UE for handing over from the LTE to the CS domain of the 2G or 3G network, which avoids that a CS domain resource is allocated for the CSFB after the UE hands over from the LTE network to a PS domain of the 2G or 3G network or is redirected to the 2G or 3G network, thereby reducing an access delay when the UE accesses the CS domain of the 2G or 3G network, shortening entire voice call duration, and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a network handover method, where in a circuit switched fallback implementation process, UE is triggered to hand over from an LTE network to a CS domain of a 2G or 3G network, which reduces an access delay when the UE accesses the CS domain of the 2G or 3G network, and also improves user experience. The embodiments of the present invention further provide a corresponding device and system. The following gives detailed descriptions.

Full names and abbreviations of some communications terms involved in the embodiments of the present invention include: a mobility management entity (MME), an evolved base station (eNodeB), user equipment (UE), a mobile switching center (MSC), a second generation or third generation mobile communications technology (2G or 3G), a base station (BS), where the base station in the embodiments of the present invention include a base station controller (BSC) and a radio network controller (RNC), Long Term Evolution (LTE), a serving GPRS support node (SGSN), circuit switched fallback (CSFB), terrestrial radio access network (UTRAN), global system for mobile communications (GSM), enhanced data rates for GSM evolution (EDGE), and global system for mobile communications/enhanced data rates for GSM evolution radio access network (GERAN).

First, second, third, fourth, and fifth in the embodiments of the present invention are only used for distinguishing different indication information, messages, or other objects, and do not represent a sequence relationship.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
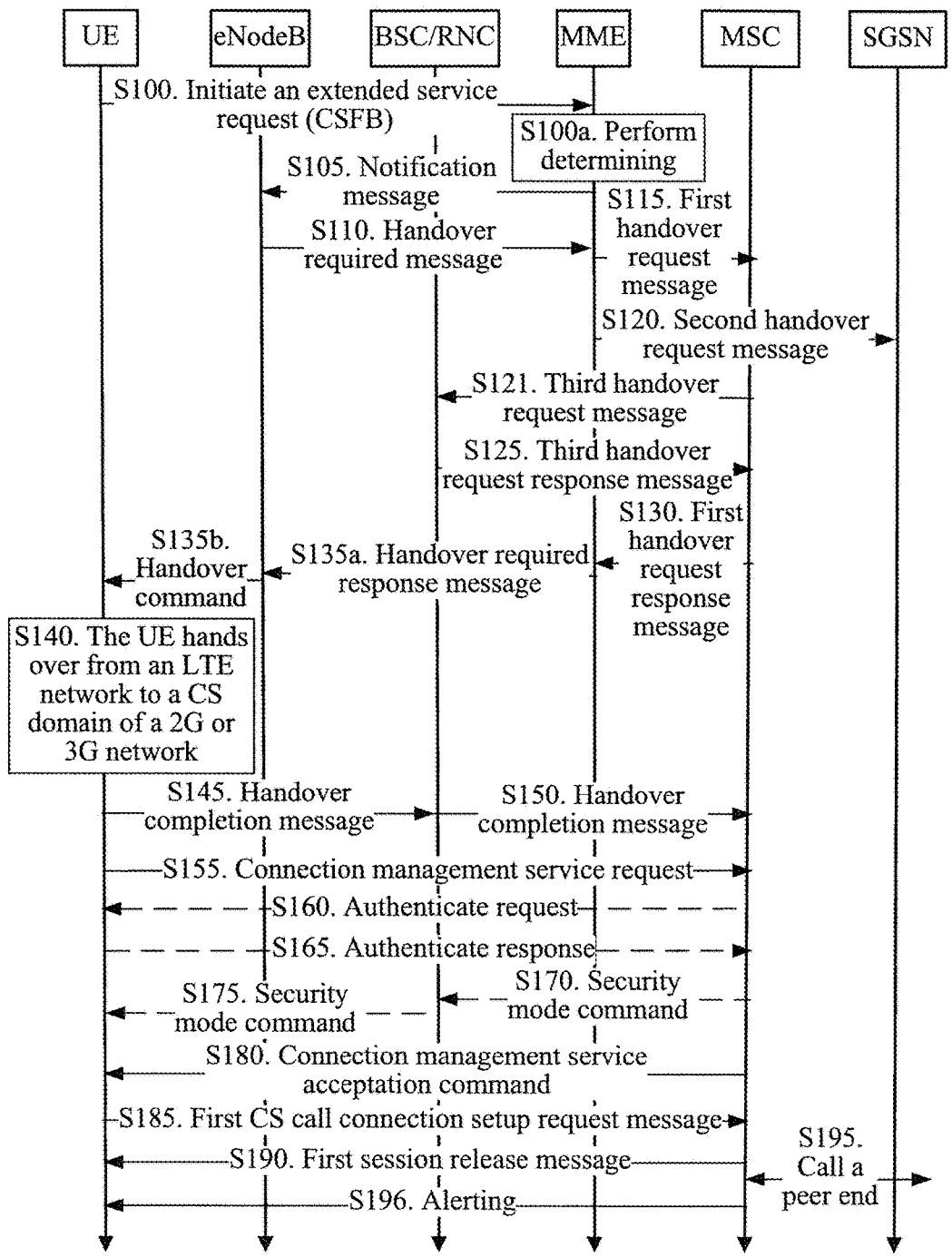
FIG. 1 is a schematic diagram of an embodiment of a network handover method according to an embodiment of the present invention.

Referring to FIG. 1, FIG. 1 shows a fallback process implemented by UE by handing over from an LTE network to a 2G or 3G network and a calling process after the handover.

S100: UE sends an extended service request to an MME, where the extended service request is used for requesting circuit switched fallback CSFB.

S100a: The MME may determine whether an LTE network and a 2/3G network support handing over the UE from the LTE network to a CS domain of the 2G or 3G network for the CSFB.

The MME may also not perform the determining, and instead, considers by default that a communications network supports handing over the UE from the LTE network to the CS domain of the 2G or 3G network for the CSFB, or only performs determining on some networks.

The communications network is the LTE network and the 2G or 3G network.

S105: The MME sends a notification message to an evolved base station eNodeB according to the extended service request, where the notification message is used for instructing the eNodeB to move the UE from the LTE network to the CS domain of the 2G or 3G network for the CSFB, that is, the notification message is used for indicating to the eNB that the UE should be moved to the 2G or 3G network for the CSFB.

When the MME determines that the LTE network and the 2G or 3G network support handing over the UE from the LTE network to the CS domain of the 2G or 3G network for the CSFB, the MME may notify, by sending the notification message, the eNodeB of whether the LTE network and the 2G or 3G network support handing over the UE from the LTE network to the CS domain of the 2G or 3G network for the CSFB, so that the eNodeB initiates a handover required of handing over the UE from the LTE network to the CS domain of the 2G or 3G network for the CSFB.

For example, the notification message may include indication information, where the indication information is used for indicating that the communications network and the UE support handing over the UE from the LTE network to the CS domain of the 2G or 3G network for the CSFB.

For example, the indication information may be indication information of a single radio voice call continuity (SRVCC) handover, and is used for indicating that the LTE network and the 2G/3G network support handing over the UE from the LTE network to the 2G or 3G network for the CSFB.

The indication information in the embodiments of the present invention may be referred to as an optimized CSFB indicator, a SRVCC based CSFB indicator, an enhanced CSFB indicator, or an enhanced CSFB possible indicator, or an SRVCC operation possible indicator.

S110: The eNodeB sends a handover required message to the MME.

The handover required message may be a handover required message of a handover from the LTE network to a packet switching PS domain of the 2G or 3G network (for example, an LTE to 2/3G PS HO Required message), or a handover required message of a handover from the LTE network to the CS domain of the 2G or 3G network (for example, an LTE to 2/3G SRVCC HO Required message), or a handover required message of a handover from the LTE network to a PS domain and the CS domain of the 2G or 3G network (for example, an LTE to 2/3G SRVCC and PS HO Required message).

The handover required message may include capability information of the UE, which is used for indicating frequency band information, an access capability, and the like supported by the UE. For example, the capability information of the UE may be at least one of a class mark 2 (classmark2) and a class mark 3 (classmark3). In the prior art, when the UE does not support a CS handover from the LTE network to the 2G/3G network, the eNodeB may not send the capability information of the UE to the MME; therefore, the MME does not have the capability information of the UE. After acquiring the capability information of the UE, the MME may send the capability information of the UE to an MSC, so that the MSC can execute the handover to the 2G/3G CS. In this embodiment of the present invention, the capability information of the UE may be transferred to the MME by using a handover required message.

The handover required message includes first indication information, where the first indication information is used for requesting the MME to hand over the UE from the LTE network to the CS domain of the 2G or 3G network for the CSFB;

or, the first indication information is used for requesting the MME to hand over the UE from the LTE network to the CS domain of the 2G or 3G network for the CSFB, and indicating that the UE supports a handover from the LTE network to the CS domain of the 2G or 3G network;

or, the handover required message includes a source to target transparent container, where the source to target transparent container includes second indication information, and the second indication information is used for requesting a base station in the 2G or 3G network to hand over the UE from the LTE network to the CS domain of the 2G or 3G network for the CSFB.

The first indication information may be referred to as a CSFB indicator, an optimized CSFB indicator, an SRVCC based CSFB indicator, an enhanced CSFB indicator, or an enhanced CSFB possible indicator.

When the second indication information does not indicate that the UE supports a handover from the LTE network to the CS domain of the 2G or 3G network, the MME may consider by default that the UE supports the handover. When the first indication information does not indicate that the UE supports a handover from the LTE network to the CS domain of the 2G or 3G network, the base station in the 2/3G network may consider by default that the UE supports the handover. The second indication information and the first indication information each may be referred to as a CSFB indicator, an optimized CSFB indicator, an SRVCC based CSFB indicator, an enhanced CSFB indicator, or an enhanced CSFB possible indicator.

For example, the second indication information may include a CSFB indicator field, or a CSFB indicator field and a UE capability field. The CSFB indicator field instructs the MME to hand over the UE from the LTE network to the circuit switching CS domain of the 2G or 3G network for the CSFB. The UE capability field represents that the UE supports a handover from the LTE network to the PS domain of the 2G or 3G network.

The first indication information may include a CSFB indicator field, or a CSFB indicator field and a UE capability field. The CSFB indicator field instructs the base station in the 2/3G network to hand over the UE from the LTE network to the circuit switching CS domain of the 2G or 3G network for the CSFB. The UE capability field represents that the UE supports a handover from the LTE network to the PS domain of the 2G or 3G network.

For example:

a) when a target network is a UTRAN network, the eNodeB adds the second indication information to a source RNC to target RNC transparent container; a CSFB information field in an existing source RNC to target RNC transparent container may be used as a CSFB indicator field; and one field may be added in the source RNC to target RNC transparent container and is used as the UE capability field; and b) when the target network is a GERAN network, the eNodeB adds the second indication information in old BSS to new BSS info/illation; a CSFB indicator field or a UE capability field may be added in the old BSS to new BSS information.

S115: The MME sends a first handover request message to the MSC, where the first handover request message is used for requesting an MSC to hand over the UE from the LTE network to the circuit switching CS domain of the second generation 2G or third generation 3G network for the CSFB.

Because the first handover request message is sent by the MME to the MSC, a handover required by the first handover request message is a handover from the LTE network to the CS domain of the 2G or 3G network, that is, the first handover request is a handover request from PS to CS.

The first handover request message may carry third indication information, where the third indication information is used for requesting the MSC to hand over the UE from the LTE network to the CS domain of the 2G or 3G network for the CSFB, that is, the third indication information represents that the first handover request is sent for the CSFB. The third indication information may further indicate that the UE supports a handover from the LTE network to the CS domain of the 2G or 3G network. The first handover request message may also not indicate the CSFB, and in this case, the MSC considers by default that the first handover request is sent for the CSFB.

When the MME receives the capability information of the UE from the eNodeB, the first handover request message may carry the capability information of the UE, for example, the capability information is at least one of a class mark classmark 2 and a class mark classmark3.

Because the UE does not support a handover from the LTE network to the CS domain of the 2G or 3G network, the UE may not report voice codec information supported by the UE, and in this case, the MME may include default voice codec information in the first handover request message according to a target system of the handover.

The third indication information in the first handover request message may be referred to as a CSFB indicator, an optimized CSFB indicator, a SRVCC based CSFB indicator, an enhanced CSFB indicator, or an enhanced CSFB possible indicator.

When the first handover request message carries a session transfer number-single radio (Session Transfer Number-Single Radio, STN-SR), the MSC ignores the STN-SR number.

S120: The MME sends a second handover request message to an SGSN, where the second handover request message is used for requesting the SGSN to initiate a handover from the LTE network to a packet switching PS domain of the 2G or 3G network.

When the UE hands over from the LTE network to the CS domain, the UE may simultaneously hand over to the PS domain, or may also not simultaneously hand over to the PS domain. In this way, dependence of this solution on a network can be reduced, that is, it is only required that an operator supports a handover from the LTE to the CS domain of the 2G or 3G network, and the operator does not need to support a handover from the LTE to the PS domain of the 2G or 3G network.

S121: The MSC sends a third handover request message to a base station, where the third handover request message is used for requesting the base station to allocate a CS domain resource to the UE for handing over to the CS domain of the 2G or 3G network;

The third handover request message is further used for requesting the base station to hand over the user equipment UE from the Long Term Evolution LTE network to the circuit switching CS domain of the 2G or 3G network for the CSFB. The base station allocates the CS domain resource to the UE for handing over from the LTE network to the CS domain of the 2G or 3G network. For example, the CS domain resource allocated by the base station includes a wired resource between the base station and the MSC and a wireless resource between the base station and the UE.

For example, the third handover request message includes fifth indication information, where the fifth indication information is used for requesting the base station to hand over the UE from the LTE network to the CS domain for the CSFB;

and/or, the fifth indication information is further used for indicating that the UE supports a handover from the LTE network to the CS domain of the 2G or 3G network.

The third handover request message includes a source to target transparent container, and the source to target transparent container includes the fifth indication information.

When the first handover request message does not include the voice codec information supported by the UE, the MSC sets default voice codec information according to a type of the 2G or 3G network, where the default voice codec information may be included in the third handover request message.

The third handover request message includes integrity protection information and/or encryption information, so that the base station sends a security mode command to the UE after receiving a handover completion message.

S125: The base station sends a third handover request response message to the MSC, where the third handover request response message includes information about a CS domain wireless resource, and the information about the CS domain wireless resource is used for the UE to hand over from the LTE network to the CS domain of the 2G or 3G network.

S130: The MSC sends a first handover response message to the MME, where the first handover response message includes the information about the CS domain wireless resource.

S135a: The MME sends a handover required response message to the eNodeB, where the handover required response message includes the information about the CS domain wireless resource.

S135b: The eNodeB sends a handover command to the UE, where the handover command includes the information about the CS domain wireless resource.

For example, the handover command includes fourth indication information, where the fourth indication information is used for instructing the UE to hand over from the LTE network to the CS domain of the 2G or 3G network for the CSFB.

For example, the handover command further includes information about a PS domain resource, and the UE hands over from the LTE network to the PS domain of the 2G or 3G network according to the information about the PS domain resource.

The handover command may further be used for instructing the UE to hand over from the LTE network to the PS domain of the 2G or 3G network.

S140: The UE hands over from the LTE network to the CS domain of the 2G or 3G network according to the handover command.

The UE hands over, by using the resource information included in the handover command, from the LTE network to the CS domain of the 2G or 3G network for the CSFB.

The UE generates a third session in a process of handing over from the LTE network to the CS domain of the 2G or 3G network. The UE may also not generate a session in a process of handing over from the LTE network to the CS domain of the 2G or 3G network.

When the resource information includes a CS encryption algorithm identifier, the UE activates CS domain encryption according to the CS encryption algorithm identifier in a process of handing over from the LTE network to the 2G network or 3G network.

S145: After completing handover, the UE sends a handover completion message to the base station (the BSC or the RNC).

After receiving the handover completion message, in response to the handover completion message, the base station needs to include a location area identity (LAI) in UTRAN mobility information sent by the UE, which may cause that the UE initiates location area update (LAU) in this embodiment, thereby causing that setup of a CS call fails. In order to avoid the failure, the base station may not include the location area identity in the UTRAN mobility information sent by the UE.

The base station may send the LAI to the UE when sending the UTRAN mobility information in a subsequent process, for example, the following method may be used:

a) after receiving the handover completion message, the base station starts a timer, and after the timer expires, the base station sends the UTRAN mobility information, and sends the LAI to the UE; or, b) when receiving a call IU release command or a call connection completion (Connect) message, the base station sends the UTRAN mobility message, and sends the LAI to the UE, where, for a calling party, the MSC sends a call connection completion (Connect) message to the UE; and for a called party, the UE sends a call connection completion (Connect) message to the MSC.

Alternatively, when the UE sends an LAU message to the base station, to avoid a failure, the base station does not send the location update request message to the MSC, and the base station directly sends a location update acceptance message to the UE.

S150: The base station forwards the handover completion message in step S145 to the MSC.

S155: The UE sends a connection management service request to the MSC.

S160: The MSC sends an authenticate request to the UE.

Step S160 may also not be performed, that is, the MSC does not send the authenticate request message to the UE.

S165: The UE sends an authenticate response to the MSC.

S170: The MSC sends a security mode command to the base station, where the security mode command carries integrity protection information and/or encryption information, so that the base station sends the security mode command to the UE.

Step S170 may also not be performed, that is, the MSC does not send the security mode command to the base station.

S175: The base station sends the security mode command to the UE. Specifically, the base station performs this step according to the security mode command in step S170, or the base station performs this step after receiving the message in S145.

S180: Optionally, the MSC sends a connection management service acceptation command (CM service Accept) to the UE.

S185: The UE sends a first CS call connection setup request message (Setup) to the MSC, where the first CS call connection setup request message is used for requesting the MSC to generate a first session for the CSFB, or, the first CS call connection setup request message is used for requesting the MSC to generate a third session for the CSFB.

S190: After receiving the first CS call connection setup request message, if the first CS call setup request message is used for requesting the MSC to generate the first session for the CSFB, the MSC sends a first session release message to the UE, where the first session release message is used for requesting the UE to release the third session that is generated by the UE in a process of handing over from the LTE network to the CS domain of the 2G or 3G network.

If the first CS call connection setup request message is used for requesting the MSC to generate the third session for the CSFB, the MSC does not need to send the first session release message to the UE.

S195: The MSC calls a peer end.

S196: The MSC sends an alerting (Alerting) message to the UE. The UE waits for a response message from the peer end.

Further, the called party picks up, and a conversation state is entered.

After the call ends, because the call is triggered by the CSFB, the UE needs to return to the LTE network after completing the call. The base station determines, according to the third handover request message, that the call is triggered by the CSFB, and after receiving a call release message sent by the MSC, the base station in the 2G/3G network redirects the UE to the LTE network, or, the base station hands over the UE to the LTE network, where the call release message is a release command Iu Release Command or a clear command Clear Command.

It should be noted that, in this embodiment, the base station may parse CS signaling between the UE and the MSC. The base station receives a signaling message that is sent by the UE to the MSC, for example, a connection management service request, an authenticate response, or a first CS call connection setup request message. The base station may send the signaling message to the MSC by using a connection that is set up in a process of handing over from the LTE network to the CS domain of the 2G or 3G network, or send the signaling message to the MSC by using a direct transmission message.

In this embodiment, the indication information, the first indication information, the second indication information, the third indication information, the fourth indication information, and the fifth indication information that are included in the notification message may include a CSFB indicator field, or a CSFB indicator field and a UE capability field. The CSFB indicator field instructs the MME or the MSC or the base station in the 2/3G network to hand over the UE from the LTE network to the circuit switching CS domain of the 2G or 3G network for the CSFB. The UE capability field represents that the UE supports a handover from the LTE network to the PS domain of the 2G or 3G network.

In FIG. 1, in a circuit switched fallback implementation process, a handover from an LTE network to a 2G or 3G network is triggered, so that UE can directly hand over from the LTE network to a CS domain of the 2G or 3G network. In this way, a resource may be allocated on a network side to the UE for handing over from the LTE to the CS domain of the 2G or 3G network, which avoids that a CS domain resource is allocated for the CSFB after the UE hands over from the LTE network to a PS domain of the 2G or 3G network or is redirected to the 2G or 3G network, thereby reducing an access delay when the UE accesses the CS domain of the 2G or 3G network.

Figure 2:
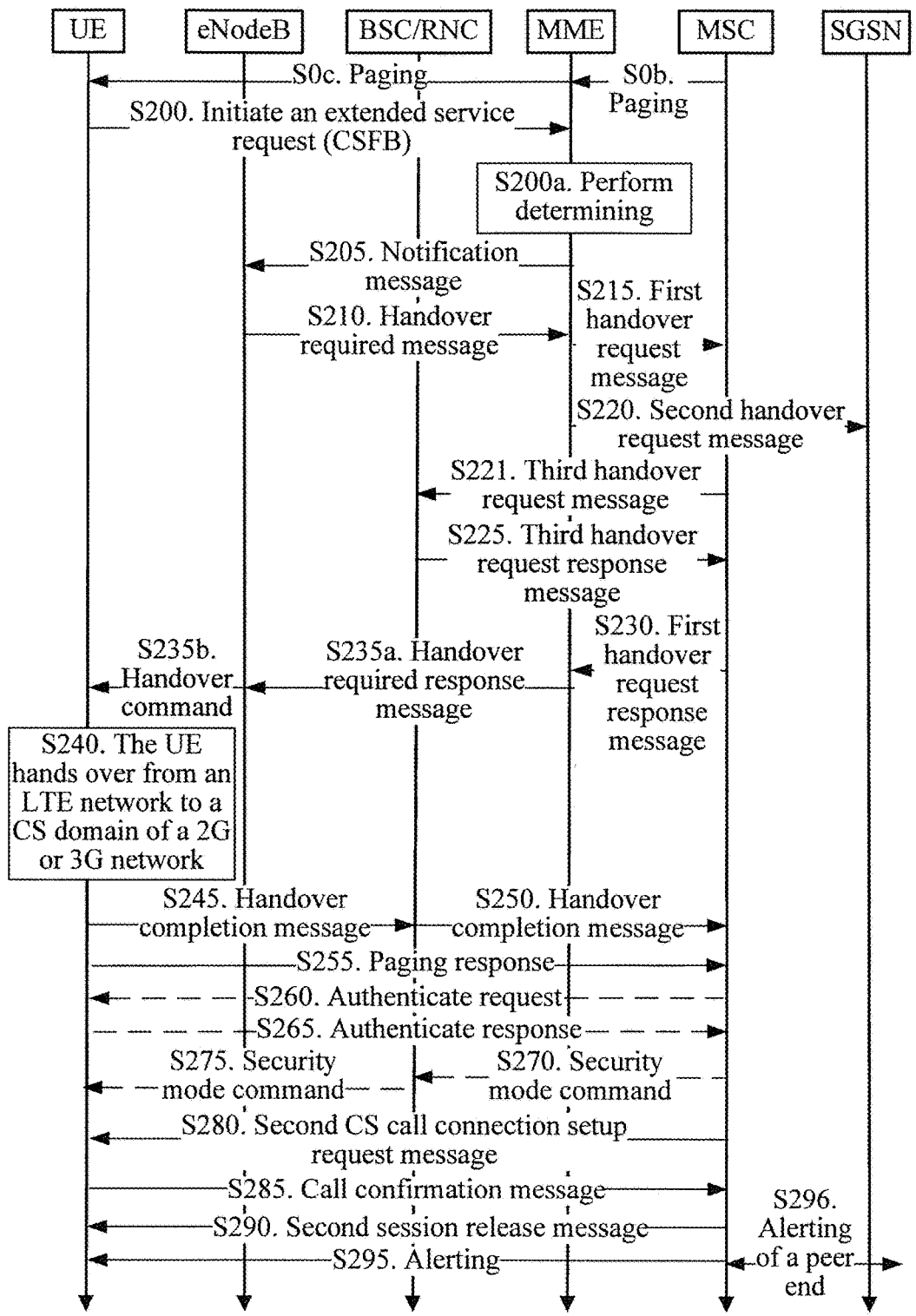
FIG. 2 is a schematic diagram of another embodiment of a network handover method according to an embodiment of the present invention.

Referring to FIG. 2, FIG. 2 shows a network handover process and a called process after the network handover according to an embodiment of the present invention.

S0b to S0c: An MSC sends a CS paging request to an MME, and the MME triggers a paging process.

Steps S200 to S250 are the same as steps S100 to S150 in FIG. 1, and details are not described herein again.

S255: UE sends a paging response to the MSC.

S260: The MSC sends an authenticate request to the UE.

Step S260 may also not be performed, that is, the MSC does not send the authenticate request message to the UE.

S265: The UE sends an authenticate response to the MSC.

S270: The MSC sends a security mode command to the base station, where the security mode command carries integrity protection information and/or encryption information, so that the base station sends the security mode command to the UE.

Step S270 may also not be performed, that is, the MSC does not send the security mode command to the base station.

S275: The base station sends the security mode command to the UE. Specifically, the base station performs this step according to the security mode command in step S270, or the base station performs this step after receiving the message in S245.

S280: The MSC sends a second CS call connection setup request message to the UE, where the second CS call connection setup request message is used for requesting the UE to generate a second session for the CSFB, or, the second CS call connection setup request message is used for requesting the UE to generate a third session for the CSFB.

After a step of receiving, by the UE, the second CS call connection setup request message sent by the mobile switching center MSC, the method further includes:

receiving or sending, by the UE, session data of the second session by using the resource.

S285: The MSC receives a call continuation message sent by the UE.

S290: If the second CS call connection setup request message is used for requesting the UE to generate the second session for the CSFB, the MSC sends a second session release message to the UE, where the second session release message is used for requesting the UE to release the third session that is generated by the UE in a process of handing over from the LTE network to the CS domain of the 2G or 3G network.

If the second CS call connection setup request message is used for requesting the UE to generate the third session for the CSFB, the MSC does not need to send the second session release message to the UE.

The UE receives the session release message sent by the MSC.

S295: The MSC sends an alerting message to the UE. The UE enters a conversation state.

S296: The MSC triggers alerting of a peer end.

After the call ends, because the call is triggered by the CSFB, the UE needs to return to the LTE network after completing the call. The base station determines, according to the third handover request message, that the call is triggered by the CSFB; therefore, after receiving a call release message sent by the MSC, the base station in the 2G/3G network redirects the UE to the LTE network, or, the base station hands over the UE to the LTE network, where the call release message is a release command Iu Release Command or a clear command Clear Command.

It should be noted that, in this embodiment, the base station may parse CS signaling between the UE and the MSC. The base station receives a signaling message that is sent by the UE to the MSC, for example, a call confirmation message, an authenticate response, or a second CS call connection setup request message. The base station may send the signaling message to the MSC by using a connection that is set up in a process of handing over from the LTE network to the CS domain of the 2G or 3G network, or send the signaling message to the MSC by using a direct transmission message.

In this embodiment, the indication information, the second indication information, the third indication information, the fourth indication information, and the fifth indication information that are included in the notification message may include a CSFB indicator field, or a CSFB indicator field and a UE capability field. The CSFB indicator field instructs the MME to hand over the UE from the LTE network to the circuit switching CS domain of the 2G or 3G network for the CSFB. The UE capability field represents that the UE supports a handover from the LTE network to the PS domain of the 2G or 3G network.

In this embodiment of the present invention, in a circuit switched fallback implementation process, a handover from an LTE network to a 2G or 3G network is triggered, so that UE can directly hand over from the LTE network to a CS domain of the 2G or 3G network. In this way, a resource may be allocated on a network side to the UE for handing over from the LTE to the CS domain of the 2G or 3G network, which avoids that a CS domain resource is allocated for the CSFB after the UE hands over from the LTE network to a PS domain of the 2G or 3G network or is redirected to the 2G or 3G network, thereby reducing an access delay when the UE accesses the CS domain of the 2G or 3G network, shortening entire voice call duration, and improving user experience.

In the foregoing two application scenarios, an entire network handover and session process is described from two aspects: UE is a calling party and UE is a called party.

Figure 3:
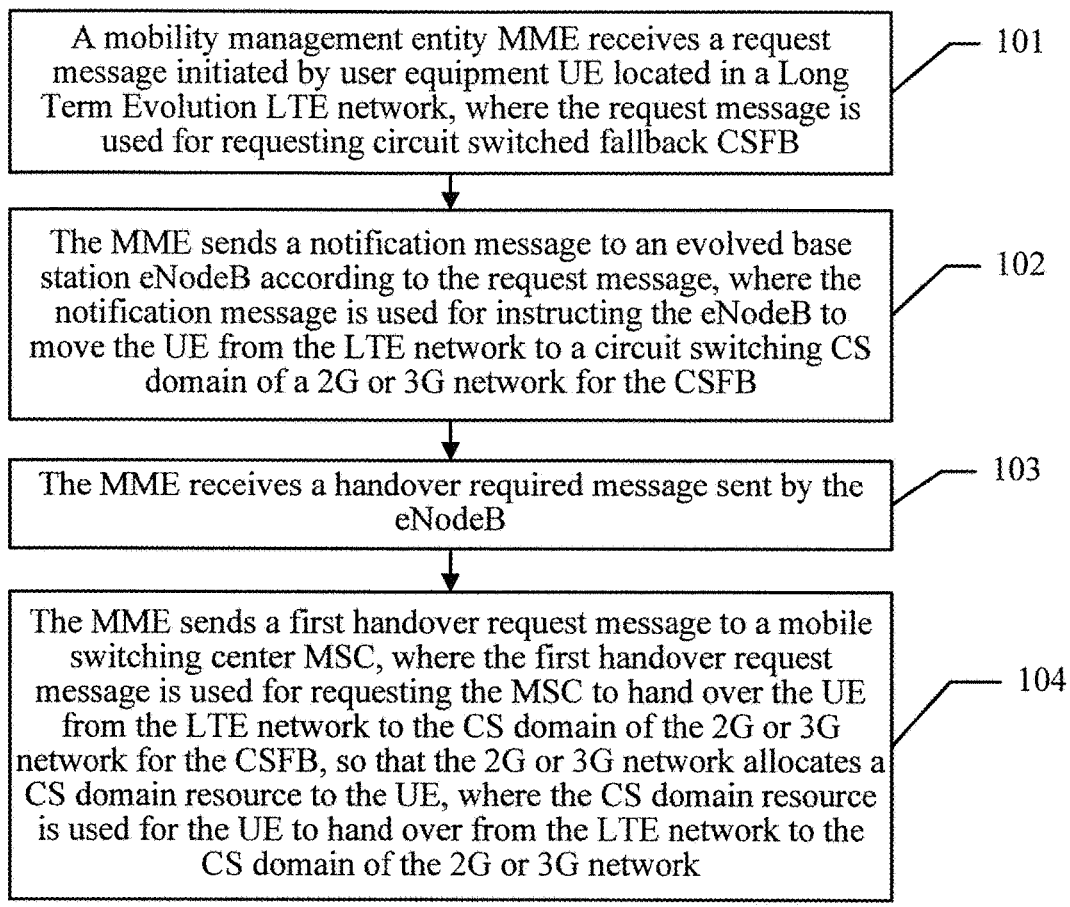
FIG. 3 is a schematic diagram of another embodiment of a network handover method according to an embodiment of the present invention.

Referring to FIG. 3, an embodiment of a network handover method provided in an embodiment of the present invention includes:

101: A mobility management entity MME receives a request message initiated by user equipment UE located in a Long Term Evolution LTE network, where the request message is used for requesting circuit switched fallback CSFB.

The request message may be an extended service request message.

102: The MME sends a notification message to an evolved base station eNodeB according to the request message, where the notification message is used for instructing the eNodeB to move the UE from the LTE network to a circuit switching CS domain of a 2G or 3G network for the CSFB.

103: The MME receives a handover required message sent by the eNodeB.

104: The MME sends a first handover request message to a mobile switching center MSC, where the first handover request message is used for requesting the MSC to hand over the UE from the LTE network to the CS domain of the 2G or 3G network for the CSFB, so that the 2G or 3G network allocates a CS domain resource to the UE, where the CS domain resource is used for the UE to hand over from the LTE network to the CS domain of the 2G or 3G network.

For detailed descriptions of the foregoing processing steps and other processing steps of the MME in this embodiment, reference may be made to descriptions of the embodiment corresponding to FIG. 1 or FIG. 2, and details are not described herein again.

Figure 4:
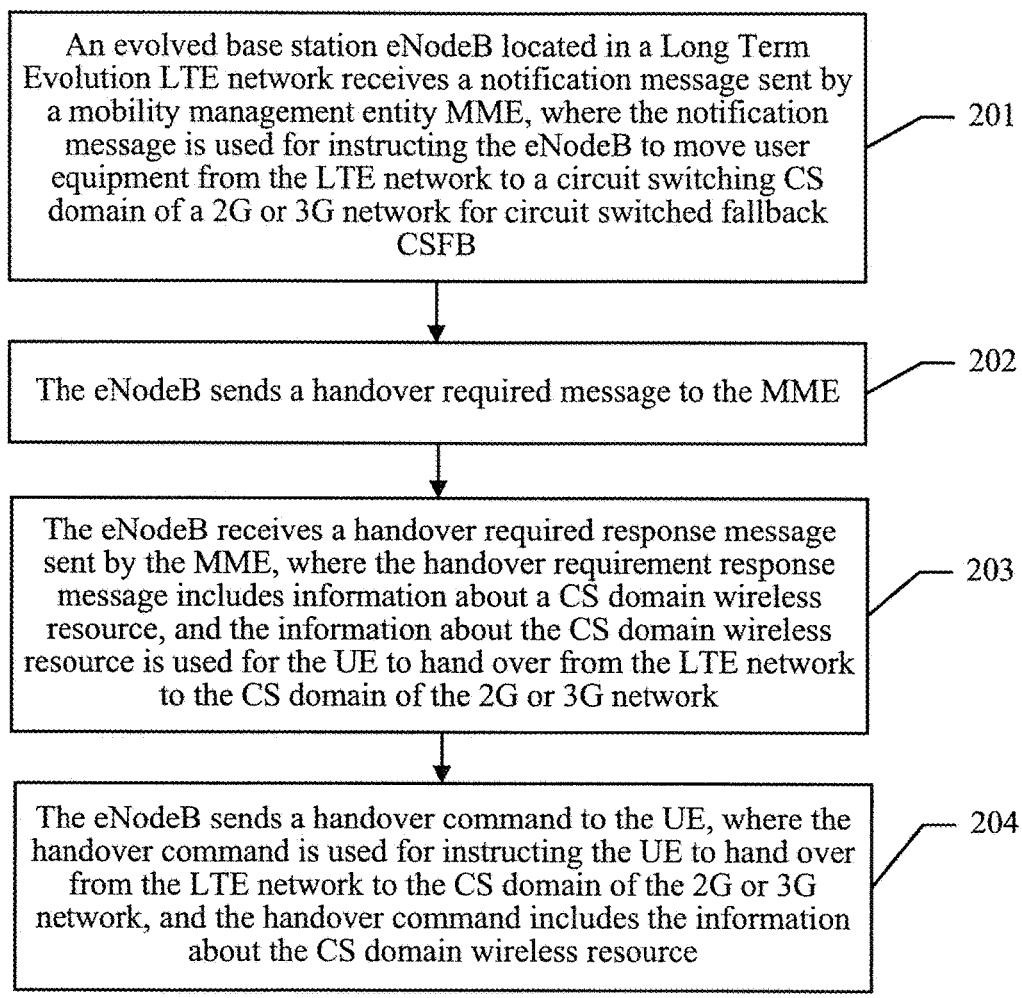
FIG. 4 is a schematic diagram of another embodiment of a network handover method according to an embodiment of the present invention.

Referring to FIG. 4, another embodiment of a network handover method provided in an embodiment of the present invention includes:

201: An evolved base station eNodeB located in a Long Term Evolution LTE network receives a notification message sent by a mobility management entity MME, where the notification message is used for instructing the eNodeB to move user equipment from the LTE network to a circuit switching CS domain of a 2G or 3G network for circuit switched fallback CSFB.

202: The eNodeB sends a handover required message to the NNE.

203: The eNodeB receives a handover required response message sent by the MME, where the handover required response message includes information about a CS domain wireless resource, and the information about the CS domain wireless resource is used for the UE to hand over from the LTE network to the CS domain of the 2G or 3G network.

204: The eNodeB sends a handover command to the UE, where the handover command is used for instructing the UE to hand over from the LTE network to the CS domain of the 2G or 3G network, and the handover command includes the information about the CS domain wireless resource.

For detailed descriptions of the foregoing processing steps and other processing steps of the evolved base station in this embodiment, reference may be made to descriptions of the embodiment corresponding to FIG. 1 or FIG. 2, and details are not described herein again.

Figure 5:
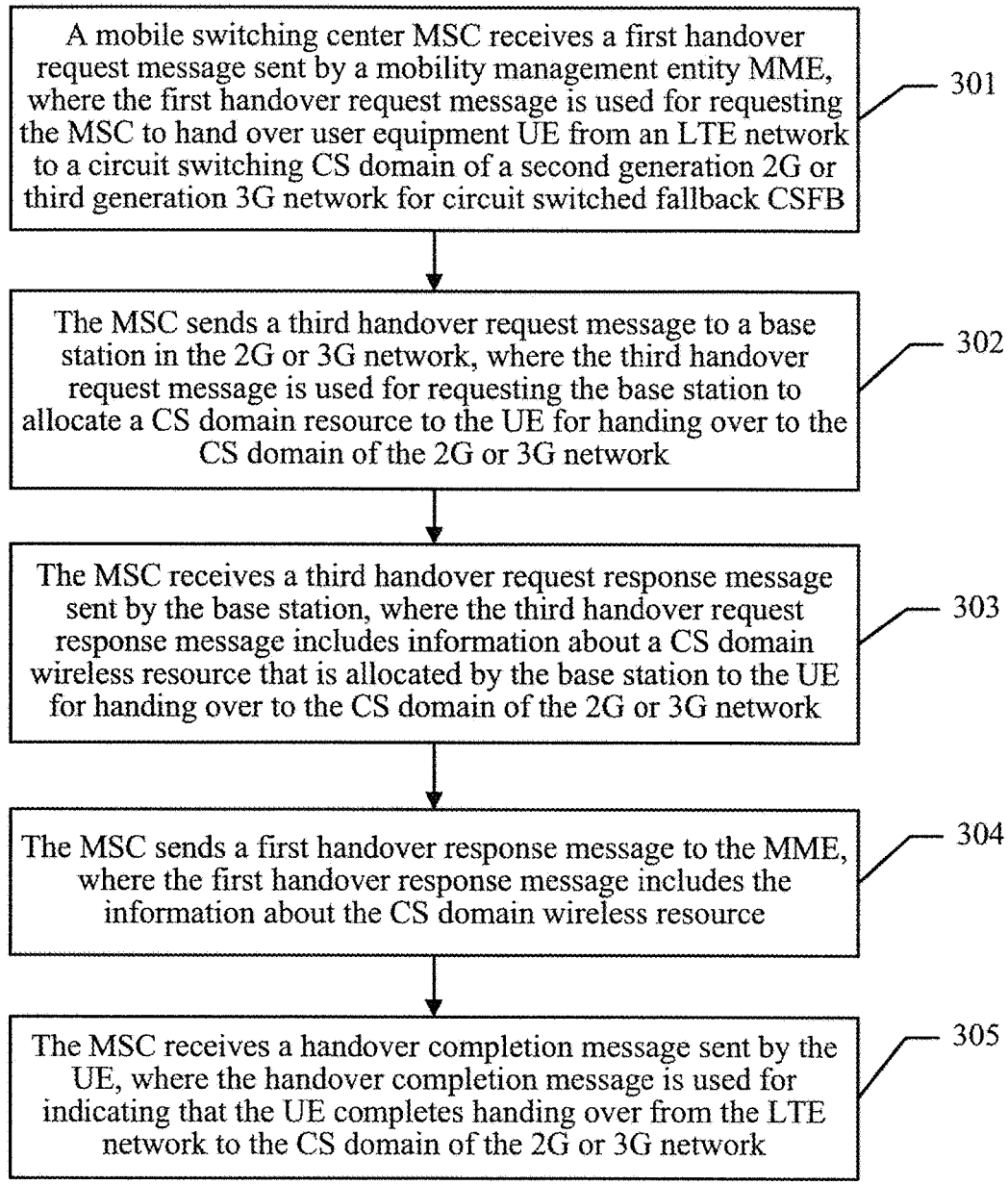
FIG. 5 is a schematic diagram of another embodiment of a network handover method according to an embodiment of the present invention.

Referring to FIG. 5, another embodiment of a network handover method provided in an embodiment of the present invention includes:

301: A mobile switching center MSC receives a first handover request message sent by a mobility management entity MME, where the first handover request message is used for requesting the MSC to hand over user equipment UE from an LTE network to a circuit switching CS domain of a second generation 2G or third generation 3G network for circuit switched fallback CSFB.

302: The MSC sends a third handover request message to a base station in the 2G or 3G network, where the third handover request message is used for requesting the base station to allocate a CS domain resource to the UE for handing over to the CS domain of the 2G or 3G network.

303: The MSC receives a third handover request response message sent by the base station, where the third handover request response message includes information about a CS domain wireless resource that is allocated by the base station to the UE for handing over to the CS domain of the 2G or 3G network.

304: The MSC sends a first handover response message to the MME, where the first handover response message includes the information about the CS domain wireless resource.

305: The MSC receives a handover completion message sent by the UE, where the handover completion message is used for indicating that the UE completes handing over from the LTE network to the CS domain of the 2G or 3G network.

The method in this embodiment may further include the following step:

receiving, by the MSC, a first CS call connection setup request message sent by the UE, where the first CS call connection setup request message is used for requesting the MSC to generate a first session for the CSFB, where this step is a calling process of the UE.

The method in this embodiment may further include the following step: sending, by the MSC, a second CS call connection setup request message to the UE, where the second CS call connection setup request message is used for requesting the UE to generate a second session for the CSFB, where this step is a called process of the UE.

For detailed descriptions of the foregoing processing steps and other processing steps of the UE in this embodiment, reference may be made to descriptions of the embodiment corresponding to FIG. 1 or FIG. 2, and details are not described herein again.

Figure 6:
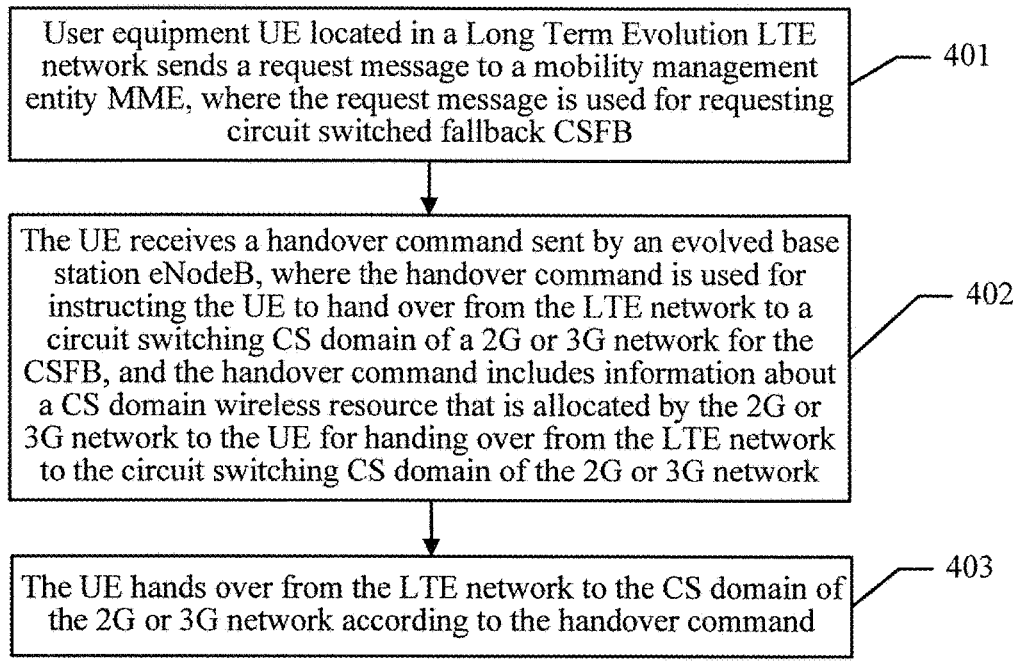
FIG. 6 is a schematic diagram of an embodiment of a network handover method according to an embodiment of the present invention.

Referring to FIG. 6, another embodiment of a network handover method provided in an embodiment of the present invention includes:

401: User equipment UE located in a Long Term Evolution LTE network sends a request message to a mobility management entity MME, where the request message is used for requesting circuit switched fallback CSFB.

The request message may be an extended service request.

402: The UE receives a handover command sent by an evolved base station eNodeB, where the handover command is used for instructing the UE to hand over from the LTE network to a circuit switching CS domain of a 2G or 3G network for the CSFB, and the handover command includes information about a CS domain wireless resource that is allocated by the 2G or 3G network to the UE for handing over from the LTE network to the circuit switching CS domain of the 2G or 3G network.

403: The UE hands over from the LTE network to the CS domain of the 2G or 3G network according to the handover command.

The method shown in FIG. 6 may further include:

sending, in the CS domain by the UE, a first CS call connection setup request message to a mobile switching center MSC, where the first CS call connection setup request message is used for requesting the MSC to generate a first session for the CSFB, where this step is a calling process.

The method shown in FIG. 6 may further include: receiving, in the CS domain by the UE, a second CS call connection setup request message sent by the MSC, where the second CS call connection setup request message is used for requesting the UE to generate a second session for the CSFB, where this step is a called process.

For detailed descriptions of the foregoing processing steps and other processing steps of the UE in this embodiment, reference may be made to descriptions of the embodiment corresponding to FIG. 1 or FIG. 2, and details are not described herein again.

Figure 7:
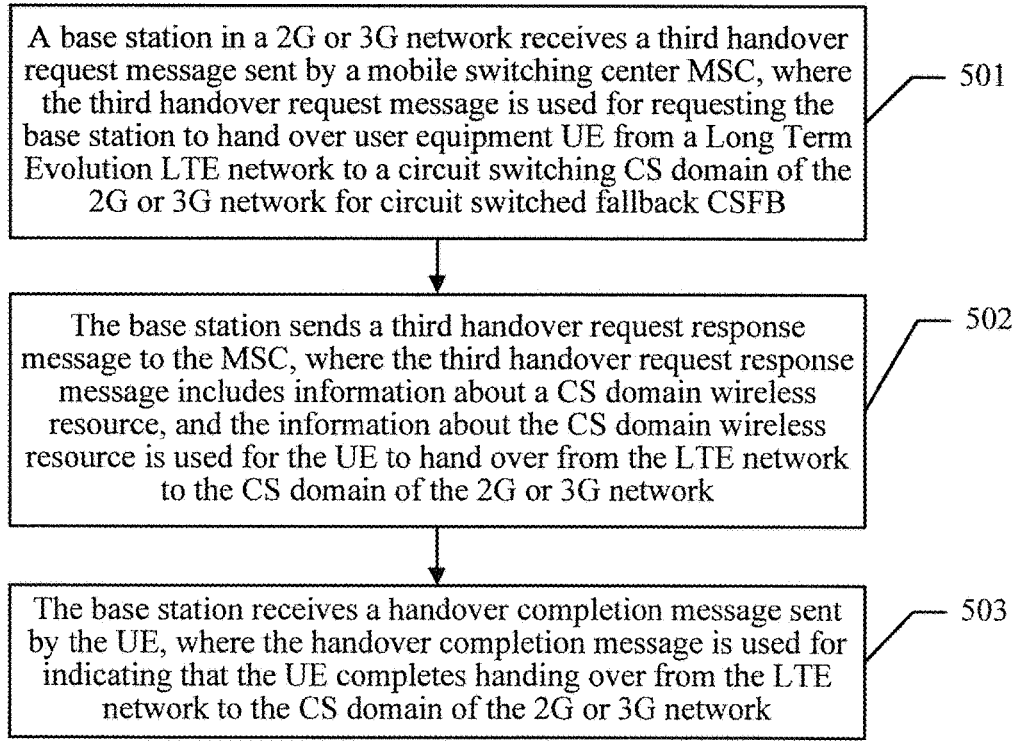
FIG. 7 is a schematic diagram of an embodiment of a network handover method according to an embodiment of the present invention.

Referring to FIG. 7, another embodiment of a network handover method provided in an embodiment of the present invention includes:

501: A base station in a 2G or 3G network receives a third handover request message sent by a mobile switching center MSC, where the third handover request message is used for requesting the base station to hand over user equipment UE from a Long Term Evolution LTE network to a circuit switching CS domain of the 2G or 3G network for circuit switched fallback CSFB.

502: The base station sends a third handover request response message to the MSC, where the third handover request response message includes information about a CS domain wireless resource, and the information about the CS domain wireless resource is used for the UE to hand over from the LTE network to the CS domain of the 2G or 3G network.

503: The base station receives a handover completion message sent by the UE, where the handover completion message is used for indicating that the UE completes handing over from the LTE network to the CS domain of the 2G or 3G network.

For detailed descriptions of the foregoing processing steps and other processing steps of the base station in the 2G or 3G network in this embodiment, reference may be made to descriptions of the embodiment corresponding to FIG. 1 or FIG. 2, and details are not described herein again.

Figure 8:
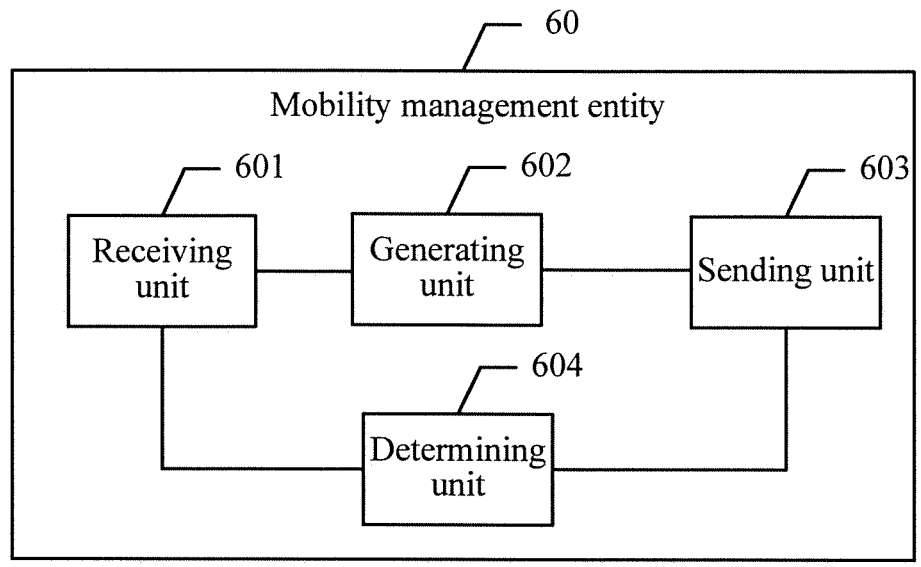
FIG. 8 is a schematic diagram of an embodiment of a mobility management entity according to an embodiment of the present invention.

Referring to FIG. 8, a mobility management entity MME 60 provided in an embodiment of the present invention includes a receiving unit 601, a generating unit 602, and a sending unit 603.

The receiving unit 601 is configured to receive a request message initiated by user equipment UE located in a Long Term Evolution LTE network, where the request message is used for requesting circuit switched fallback CSFB.

The generating unit 602 is configured to generate a notification message according to the request message received by the receiving unit 601, where the notification message is used for instructing an evolved base station eNodeB to move the UE from the LTE network to a circuit switching CS domain of a second generation 2G or third generation 3G network for the CSFB.

The sending unit 603 is configured to send the notification message generated by the generating unit 602 to the eNodeB.

The receiving unit 601 is further configured to receive a handover required message sent by the eNodeB.

The generating unit 602 is further configured to generate a first handover request message according to the handover required message received by the receiving unit 601, where the first handover request message is used for requesting an MSC to hand over the UE from the LTE network to the CS domain of the 2G or 3G network for the CSFB.

The sending unit 603 is further configured to send the first handover request message generated by the generating unit to the mobile switching center MSC, so that the 2G or 3G network allocates a CS domain resource to the UE, where the CS domain resource is used for the UE to hand over from the LTE network to the CS domain of the 2G or 3G network.

The mobility management entity 60 may further include a determining unit 604.

The determining unit 604 is configured to determine that the LTE network and the 2G or 3G network support handing over the UE from the LTE network to the CS domain of the 2G or 3G network for the CSFB, and that the UE supports a handover from the LTE network to the CS domain of the 2G or 3G network.

The receiving unit 601 is further configured to receive a first handover response message that is sent by the MSC in response to the first handover request message, where the first handover response message includes information about a CS domain wireless resource allocated to the UE by a base station in the 2G or 3G network.

The generating unit 602 is further configured to generate a handover required response message according to the handover required message received by the receiving unit, where the handover required response message includes the information about the CS domain wireless resource, and the information about the CS domain wireless resource is used for the UE to hand over from the LTE network to the CS domain of the 2G or 3G network for the CSFB. The sending unit 603 is further configured to send the handover required response message to the eNodeB.

The mobility management entity in this embodiment may perform the steps of the method of the MME described in the method embodiments of FIG. 1, FIG. 2, and FIG. 3, where the receiving unit 601 is configured to receive a message that is sent by another entity to the MME, and the sending unit 602 is configured to send a message to another entity. A person skilled in the art may understand, according to the steps performed in the method embodiments, a relationship between behaviors and performed actions of each unit in the MME and between the units.

Figure 9:
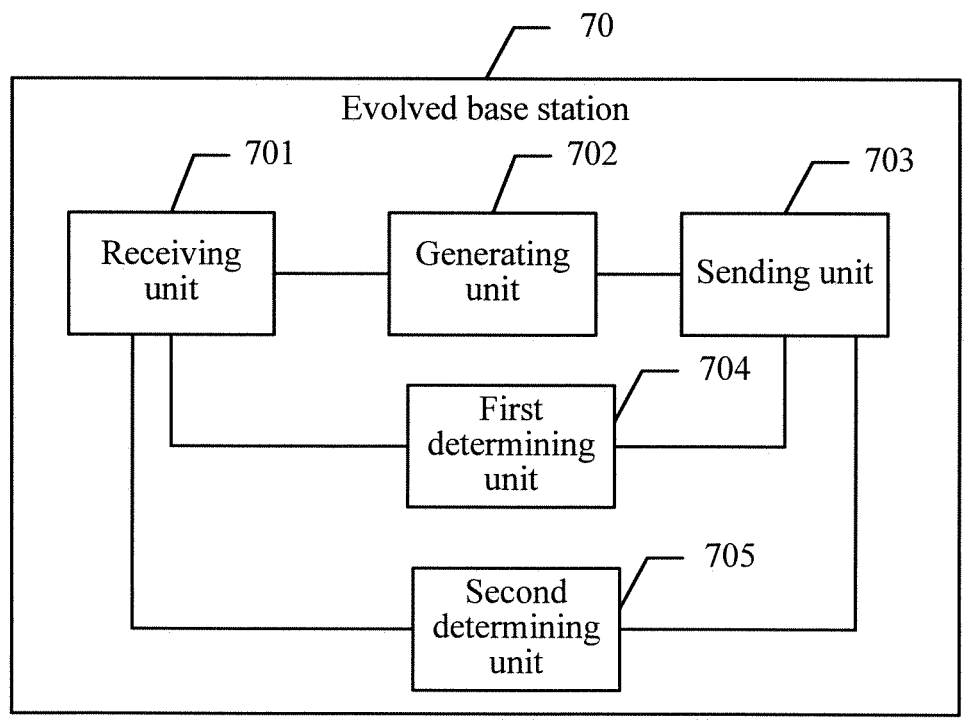
FIG. 9 is a schematic diagram of an embodiment of an evolved base station according to an embodiment of the present invention.

Referring to FIG. 9, an evolved base station 70 provided in an embodiment of the present invention includes a receiving unit 701, a generating unit 702, and a sending unit 703.

The receiving unit 701 is configured to receive a notification message sent by a mobility management entity MME, where the notification message is used for instructing the eNodeB to move user equipment UE from a Long Term Evolution LTE network to a circuit switching CS domain of a 2G or 3G network for circuit switched fallback CSFB.

The generating unit 702 is configured to generate a handover required message according to the notification message received by the receiving unit 701.

The sending unit 703 is configured to send the handover required message generated by the generating unit 702 to the MME.

The receiving unit 701 is further configured to receive a handover required response message sent by the MME, where the handover required response message includes information about a CS domain wireless resource, and the information about the CS domain wireless resource is used for the UE to hand over from the LTE network to the CS domain of the 2G or 3G network.

The generating unit 702 is further configured to generate a handover command according to the handover required response message received by the receiving unit 701, where the handover command is used for instructing the UE to hand over from the LTE network to the CS domain of the 2G or 3G network, and the handover command includes the information about the CS domain wireless resource.

The sending unit 703 is further configured to send the handover command generated by the generating unit 702 to the UE.

The evolved base station in FIG. 9 may further include a first determining unit 704 and a second determining unit 705.

The first determining unit 704 is configured to determine that the UE supports a handover from the LTE network to the CS domain of the 2G or 3G network.

The second determining unit 705 is configured to determine that the UE supports a handover from the LTE network to a PS domain of the 2G or 3G network.

When a handover required is a handover required of a handover from the LTE network to the CS domain and the PS domain of the 2G or 3G network, the handover command is further used for instructing the UE to hand over from the LTE network to the PS domain of the 2G or 3G network, where the handover command includes information about a PS domain resource of the 2G or 3G network, and the information about the PS domain resource is used for the UE to hand over from the LTE network to the PS domain of the 2G or 3G network.

The evolved base station in this embodiment may perform the steps of the method of the evolved base station described in the method embodiments of FIG. 1, FIG. 2, and FIG. 4, where the receiving unit 701 is configured to receive a message that is sent by another entity to the evolved base station, and the sending unit 702 is configured to send a message to another entity. A person skilled in the art may understand, according to the steps performed in the method embodiments, a relationship between behaviors and performed actions of each unit in the evolved base station and between the units.

Figure 10:
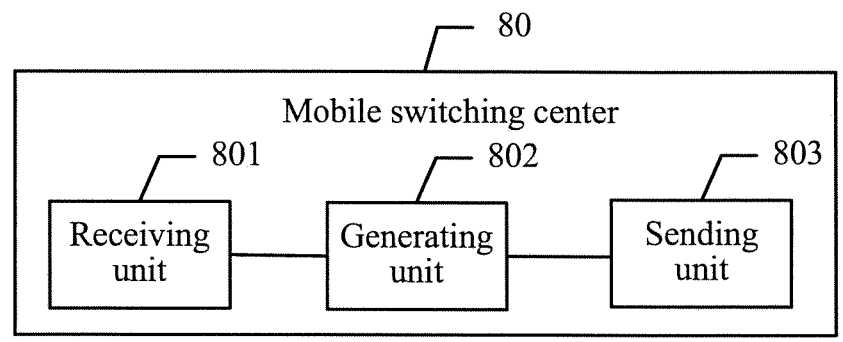
FIG. 10 is a schematic diagram of an embodiment of a mobile switching center according to an embodiment of the present invention.

Referring to FIG. 10, a mobile switching center MSC 80 provided in an embodiment of the present invention includes a receiving unit 801, a generating unit 802, and a sending unit 803.

The receiving unit 801 is configured to receive a first handover request message sent by a mobility management entity MME, where the first handover request message is used for requesting the MSC to hand over user equipment UE from an LTE network to a circuit switching CS domain of a second generation 2G or third generation 3G network for circuit switched fallback CSFB.

The generating unit 802 is configured to generate a third handover request message according to the first handover request message received by the receiving unit 801, where the third handover request message is used for requesting a base station in the 2G or 3G network to allocate a CS domain resource to the UE for handing over to the CS domain of the 2G or 3G network.

The sending unit 803 is configured to send the third handover request message generated by the generating unit 802 to the base station.

The receiving unit 801 is further configured to receive a third handover request response message sent by the base station, where the third handover request response message includes information about a CS domain wireless resource that is allocated by the base station to the UE for handing over to the CS domain of the 2G or 3G network.

The generating unit 802 is further configured to generate a first handover response message according to the first handover request message received by the receiving unit 801, where the first handover response message includes the information about the CS domain wireless resource.

The sending unit 803 is further configured to send the first handover response message generated by the generating unit 802 to the MME.

The receiving unit 801 is further configured to receive a handover completion message sent by the UE, where the handover completion message is used for indicating that the UE completes handing over from the LTE network to the CS domain of the 2G or 3G network.

The receiving unit 801 is further configured to receive a first CS call connection setup request message sent by the UE, where the first CS call connection setup request message is used for requesting the MSC to generate a first session.

The sending unit 803 is further configured to send a second CS call connection setup request message to the UE, where the second CS call connection setup request message is used for requesting the UE to generate a second session.

The sending unit 803 is further configured to: after the receiving unit receives the first CS call connection setup request message, send a session release message to the UE, where the session release message is used for requesting the UE to release a third session that is generated by the UE in a process of handing over from the LTE network to the CS domain of the 2G or 3G network.

The sending unit 803 is further configured to: after the receiving unit receives the call confirmation message, send a session release message to the UE, where the session release message is used for requesting the UE to release a third session that is generated by the UE in a process of handing over from the LTE network to the CS domain of the 2G or 3G network.

The MSC in this embodiment may perform the steps of the method of the MSC described in the method embodiments of FIG. 1, FIG. 2, and FIG. 5, where the receiving unit 801 is configured to receive a message that is sent by another entity to the MSC, and the sending unit 802 is configured to send a message to another entity. A person skilled in the art may understand, according to the steps performed in the method embodiments, a relationship between behaviors and performed actions of each unit in the MSC and between the units.

Figure 11:
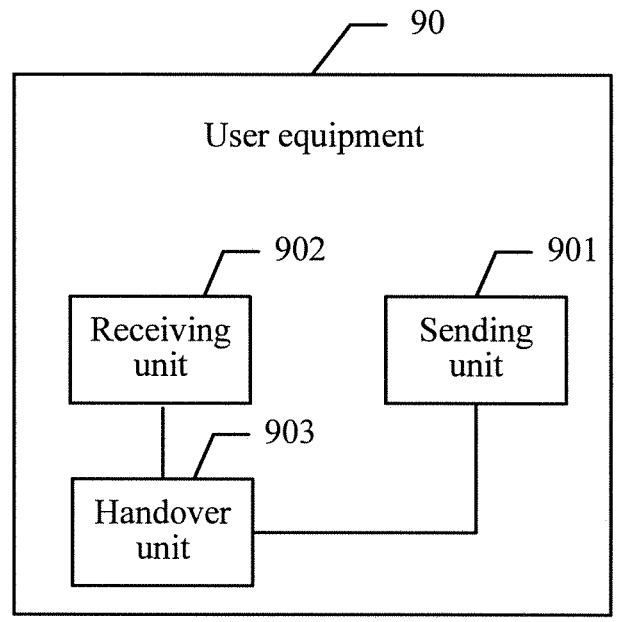
FIG. 11 is a schematic diagram of an embodiment of user equipment according to an embodiment of the present invention.

Referring to FIG. 11, user equipment 90 provided in an embodiment of the present invention includes: a sending unit 901, a receiving unit 902, and a handover unit 903.

The sending unit 901 is configured to send a request message to a mobility management entity MME, where the request message is used for requesting circuit switched fallback CSFB.

The receiving unit 902 is configured to receive a handover command sent by an evolved base station eNodeB, where the handover command is used for instructing the UE to hand over from a Long Term Evolution LTE network to a circuit switching CS domain of a 2G or 3G network for the CSFB, and the handover command includes information about a CS domain wireless resource that is allocated by the 2G or 3G network to the UE for handing over from the LTE network to the CS domain of the 2G or 3G network.

The handover unit 903 is configured to hand over from the LTE network to the CS domain of the 2G or 3G network according to the resource information received by the receiving unit 902.

The sending unit 901 is further configured to send, in the CS domain of the 2G or 3G network, a first CS call connection setup request message to a mobile switching center MSC, where the first CS call connection setup request message is used for requesting the MSC to generate a first session.

The receiving unit 902 is further configured to receive, in the CS domain of the 2G or 3G network, a second CS call connection setup request message sent by the mobile switching center MSC, where the second CS call connection setup request message is used for requesting the UE to generate a second session.

The receiving unit 902 is further configured to receive a session release message sent by the MSC, where the session release message is used for instructing the UE to release a third session that is generated by the UE in a process of handing over from the LTE network to the CS domain of the 2G or 3G network.

The UE in this embodiment may perform the steps of the method of the UE described in the method embodiments of FIG. 1, FIG. 2, and FIG. 6, where the receiving unit 901 is configured to receive a message that is sent by another entity to the UE, and the sending unit 902 is configured to send a message to another entity. A person skilled in the art may understand, according to the steps performed in the method embodiments, a relationship between behaviors and performed actions of each unit in the UE and between the units.

Figure 12:
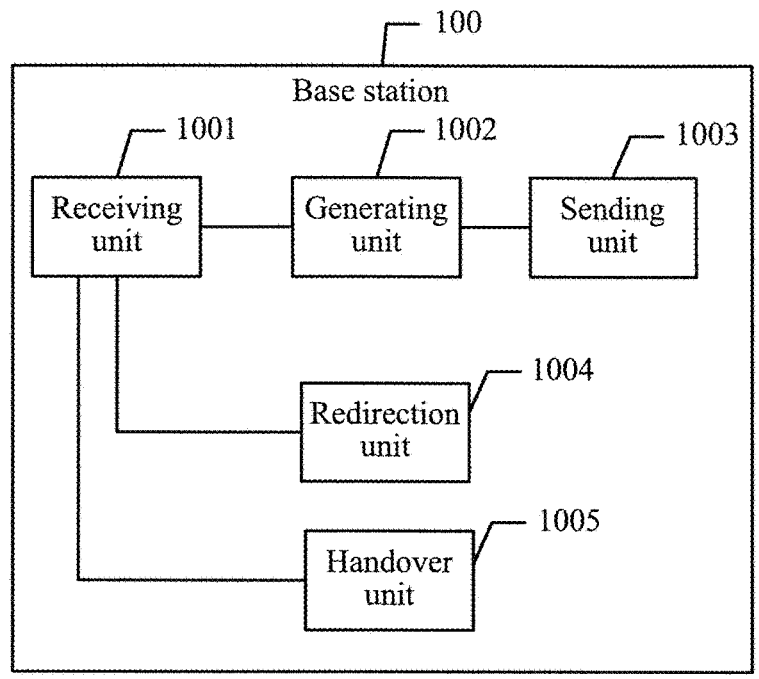
FIG. 12 is a schematic diagram of an embodiment of a base station in a 2G or 3G network according to an embodiment of the present invention.

Referring to FIG. 12, a base station 100 in a second generation 2G or third generation 3G network provided in an embodiment of the present invention includes: a receiving unit 1001, a generating unit 1002, and a sending unit 1003.

The receiving unit 1001 is configured to receive a third handover request message sent by a mobile switching center MSC, where the third handover request message is used for requesting the base station to hand over user equipment UE from a Long Term Evolution LTE network to a circuit switching CS domain of the 2G or 3G network for circuit switched fallback CSFB.

The generating unit 1002 is configured to generate a third handover request response message according to the third handover request message received by the receiving unit 1001, where the third handover request response message includes information about a CS domain wireless resource, and the information about the CS domain wireless resource is used for the UE to hand over from the LTE network to the CS domain of the 2G or 3G network.

The sending unit 1003 is configured to send the third handover request response message generated by the generating unit 1002 to the MSC.

The receiving unit 1001 is further configured to receive a handover completion message sent by the UE, where the handover completion message is used for indicating that the UE completes handing over from the LTE network to the CS domain of the 2G or 3G network.

The sending unit 1003 is further configured to send Universal Mobile Telecommunications System terrestrial radio access network UTRAN mobility information to the UE, where the UTRAN mobility information does not include a location domain identity LAI, and after a predetermined time, send the LAI to the UE.

The sending unit 1003 is further configured to send the Universal Mobile Telecommunications System terrestrial radio access network UTRAN mobility information to the UE, where the UTRAN mobility information does not include a location domain identity LAI.

The receiving unit 1001 is further configured to receive a call release command or call connection completion message sent by the MSC or a call connection completion message sent by the UE.

The sending unit 1003 is further configured to send the LAI to the UE after the receiving unit receives the call release command or the call connection completion message.

The receiving unit 1001 is further configured to receive a location update request message sent by the UE, and determine to skip sending the location update request message to the MSC.

The sending unit 1003 is further configured to send a location update acceptation message to the UE after the receiving unit 1001 receives the location update request message.

The receiving unit 1001 is further configured to receive a call release message sent by the MSC, where the call release message is an Iu interface release command or a clear command.

The base station 100 further includes a redirection unit 1004 or a handover unit 1005.

The redirection unit 1004 is configured to redirect the UE to the LTE network according to the call release message received by the receiving unit 1001.

The handover unit 1005 is configured to hand over the UE to the LTE network according to the call release message received by the receiving unit 1001.

The base station in this embodiment may perform the steps of the method of the base station described in the method embodiments of FIG. 1, FIG. 2, and FIG. 7, where the receiving unit 1001 is configured to receive a message that is sent by another entity to the base station, and the sending unit 1002 is configured to send a message to another entity. A person skilled in the art may understand, according to the steps performed in the method embodiments, a relationship between behaviors and performed actions of each unit in the base station and between the units.

In the apparatus embodiments of the present invention, in a circuit switched fallback implementation process, a handover from an LTE network to a 2G or 3G network is triggered, so that UE can directly hand over from the LTE network to a CS domain of the 2G or 3G network. In this way, a resource may be allocated on a network side to the UE for handing over from the LTE to the CS domain of the 2G or 3G network, which avoids that a CS domain resource is allocated for the CSFB after the UE hands over from the LTE network to a PS domain of the 2G or 3G network or is redirected to the 2G or 3G network, thereby reducing an access delay when the UE accesses the CS domain of the 2G or 3G network, shortening entire voice call duration, and improving user experience.

A person skilled in the art can understand that, in the embodiments of FIG. 8 to FIG. 12, the sending unit configured to send a message may be implemented by using a transmitter, and the receiving unit configured to receive a message may be implemented by using a receiver. Alternatively, the sending unit and the receiving unit both can be implemented by using a transceiver. In physical implementation, the transmitter or the transceiver may be implemented by using one physical entity, or may also be implemented by using multiple physical entities, and the transmitter and the transceiver may be implemented by using one physical entity, or may also be implemented by using multiple physical entities, which will not be limited in the present invention. Other units, such as the generating unit, an allocation unit, the redirection unit, the handover unit, and the determining unit, may be implemented by using one or more processors, which will not be limited in the present invention.

Figure 13:
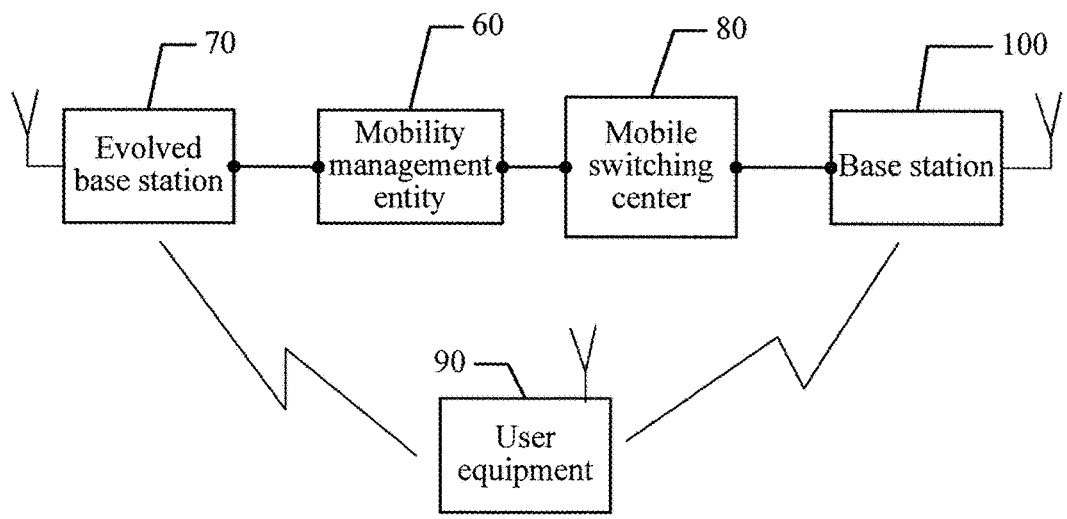
FIG. 13 is a schematic diagram of an embodiment of a system according to an embodiment of the present invention.

Referring to FIG. 13, an embodiment of a network handover system provided in an embodiment of the present invention includes: the mobility management entity 60, the evolved base station 70, the mobile switching center 80, the base station 100, and the user equipment 90.

For actions performed by the mobility management entity 60, the evolved base station 70, the mobile switching center 80, the base station 100, and the user equipment 90 and interaction therebetween, reference may be made to descriptions in FIG. 1 and FIG. 2, and descriptions of the method embodiments and the apparatus embodiments in FIG. 3 to FIG. 12, and details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The LTE network described in the present invention includes an LTE A network, and an LTE version that may exist subsequently.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network handover method, comprising:
   receiving, by a mobile switching center (MSC), a first handover request message sent by a mobility management entity (MME), wherein the first handover request message is used for requesting the MSC to hand over a user equipment (UE) from a long term evolution (LTE) network to a circuit switching (CS) domain of a second generation (2G) or a third generation (3G) network for circuit switched fallback (CSFB);
   sending, by the MSC, a third handover request message to a base station in the 2G or the 3G network, wherein the third handover request message is used for requesting the base station to allocate a CS domain resource to the UE for handing over to the CS domain of the 2G or the 3G network, wherein the CS domain resource includes a CS domain wireless resource;
   receiving, by the MSC, a third handover request response message sent by the base station, wherein the third handover request response message comprises information about the CS domain wireless resource;

sending, by the MSC, a first handover response message to the MME, wherein the first handover response message comprises the information about the CS domain wireless resource;

receiving, by the MSC, a handover completion message sent by the UE, wherein the handover completion message is used for indicating that the UE completes handing over from the LTE network to the CS domain of the 2G or the 3G network;

sending, by the MSC, a session release message to the UE, wherein the session release message is used for requesting the UE to release a third session that is generated by the UE in a process of handing over from the LTE network to the CS domain of the 2G or the 3G network; and wherein before the sending, by the MSC, the session release message to the UE, the method comprises one of the following:

receiving, by the MSC, a first CS call connection setup request message sent by the UE, wherein the first CS call connection setup request message is used for requesting the MSC to generate a first session, or receiving, by the MSC, a call confirmation message responding to a second CS call connection setup request message, wherein the second CS call connection setup request message is sent by the MSC to the UE for requesting the UE to generate a second session.

2. The method according to claim 1, wherein the first handover request message is used for indicating that the UE supports a handover from the LTE network to the CS domain of the 2G or the 3G network.

3. The method according to claim 1, wherein the first handover request message comprises a third indication information indicating:

the first handover request is sent for the CSFB, or the UE supports a handover from the LTE network to the CS domain of the 2G or the 3G network.

4. The method according to claim 3, wherein the third indication information comprises one of the following: a CSFB indicator, an optimized CSFB indicator, a single radio voice call continuity (SRVCC) based CSFB indicator, an enhanced CSFB indicator, or an enhanced CSFB possible indicator.

5. The method according to claim 1, wherein the first handover request message comprises default voice codec information.

6. The method according to claim 5, wherein the default voice codec information is set according to a type of the 2G or the 3G network.

7. The method according to claim 1, wherein the third handover request message comprises a fifth indication information used for:

requesting the base station to hand over the UE from the LTE network to the CS domain for the CSFB; or indicating that the UE supports a handover from the LTE network to the CS domain of the 2G or the 3G network.

8. A mobile switching center (MSC), comprising:

a transceiver; and at least one processor; and a non-transitory computer-readable storage medium coupled to the at least one processor and storing programming instructions for execution by the at least one processor, wherein the programming instructions instruct the at least one processor to control the transceiver to:

receive a first handover request message sent by a mobility management entity (MME), wherein the first handover request message is used for handing over a user equipment (UE) from a long term evolution (LTE) network to a circuit switching (CS) domain of a second generation (2G) or a third generation (3G) network for circuit switched fallback (CSFB), send a third handover request message to a base station in the 2G or the 3G network, wherein the third handover request message is used for requesting the base station to allocate a CS domain resource to the UE for handing over to the CS domain of the 2G or the network, wherein the CS domain resource includes a CS domain wireless resource, receive a third handover request response message sent by the base station, wherein the third handover request response message comprises information about the CS domain wireless resource, send a first handover response message to the MME, wherein the first handover response message comprises the information about the CS domain wireless resource, receive a handover completion message sent by the UE, wherein the handover completion message is used for indicating that the UE completes handing over from the LTE network to the CS domain of the 2G or the 3G network;

either receive a first CS call connection setup request message sent by the UE for requesting to generate a first session, or receive a call confirmation message responding to a second CS call connection setup request message, wherein the second CS call connection setup request message is sent by the MSC to the UE for requesting the UE to generate a second session; and send a session release message to the UE, wherein the session release message is used for requesting the UE to release a third session is generated by the UE in a process of handing over from the LTE network to the CS domain of the 2G or the 3G network.

9. The MSC according to claim 8, wherein the first handover request message is used for indicating that the UE supports a handover from the LTE network to the CS domain of the 2G or the 3G network.

10. The MSC according to claim 8, wherein the first handover request message comprises a third indication information indicating:

the first handover request is sent for the CSFB; or the UE supports a handover from the LTE network to the CS domain of the 2G or the 3G network.

11. The MSC according to claim 10, wherein the third indication information comprises one of the following: a CSFB indicator, an optimized CSFB indicator, a single radio voice call continuity (SRVCC) based CSFB indicator, an enhanced CSFB indicator, or an enhanced CSFB possible indicator.

12. The MSC according to claim 8, wherein the first handover request message comprises default voice codec information.

13. The MSC according to claim 12, wherein the default voice codec information is set according to a type of the 2G or the 3G network.

14. The MSC according to claim 8, wherein the third handover request message comprises a fifth indication information used for:

requesting the base station to hand over the UE from the LTE network to the CS domain for the CSFB; or
indicating that the UE supports a handover from the LTE network to the CS domain of the 2G or the 3G network.

* * * * *